US009022182B2

(12) United States Patent
Cavagna et al.

(10) Patent No.: US 9,022,182 B2
(45) Date of Patent: May 5, 2015

(54) BRAKE BAND FOR A VENTILATED DISC BRAKE

(75) Inventors: Lorenzo Cavagna, Bonate Sopra (IT); Nino Ronchi, Vaprio d'Adda (IT)

(73) Assignee: Freni Brembo S.p.A., Curno (IT)

( * ) Notice: Subject to any disclaimer, the term of this patent is extended or adjusted under 35 U.S.C. 154(b) by 96 days.

(21) Appl. No.: 13/509,426

(22) PCT Filed: Nov. 12, 2010

(86) PCT No.: PCT/IT2010/000455
§ 371 (c)(1),
(2), (4) Date: Jun. 26, 2012

(87) PCT Pub. No.: WO2011/058594
PCT Pub. Date: May 19, 2011

(65) Prior Publication Data
US 2012/0255821 A1    Oct. 11, 2012

(30) Foreign Application Priority Data
Nov. 13, 2009    (IT) .............................. MI2009A1992

(51) Int. Cl.
*F16D 65/847*    (2006.01)
*F16D 65/12*    (2006.01)
*F16D 65/02*    (2006.01)

(52) U.S. Cl.
CPC ............ *F16D 65/128* (2013.01); *F16D 65/847* (2013.01); *F16D 2065/1328* (2013.01)

(58) Field of Classification Search
USPC ...... 188/218 XL, 18 A, 264 A, 264 AA, 71.6
See application file for complete search history.

(56) References Cited

U.S. PATENT DOCUMENTS

| 4,865,167 A | 9/1989 | Giorgetti et al. |
| 5,542,503 A | 8/1996 | Dunn et al. |
| 2006/0243546 A1 * | 11/2006 | Oberti et al. ............ 188/218 XL |

FOREIGN PATENT DOCUMENTS

| EP | 1 373 751 B1 | 2/2007 |
| WO | WO 2009/136416 A1 | 11/2009 |

* cited by examiner

*Primary Examiner* — Robert A Siconolfi
*Assistant Examiner* — Vu Q Nguyen
(74) *Attorney, Agent, or Firm* — Dickstein Shapiro LLP

(57) ABSTRACT

Brake band (14) of a disc for a ventilated disc brake, unusually capable of reducing braking whistling, extends between an inner diameter (D1), close to a rotation axis (X-X) of the brake band (14), and an outer diameter (D2), far from said rotation axis (X-X) of the disc, said brake band (14) comprising two plates (16, 18) facing one another and defining a gap (22), comprising two plates (16, 18) being joined together by heat dissipation and connection means or elements (20, 60), said connection means (20, 60) being shaped like small columns that project from one plate towards the opposite plate in the form of pins (20, 60) remaining inside said gap (22), said pins (20, 60) being grouped in at least two rows or tiers (26, 28, 30) arranged circumferentially. Some of the pins (60) arranged in said second tier (28 or 30) having a section shaped like a rhombus or diamond with four vertices joined by four sides in which said sides defining said section are substantially rectilinear in shape.

10 Claims, 17 Drawing Sheets

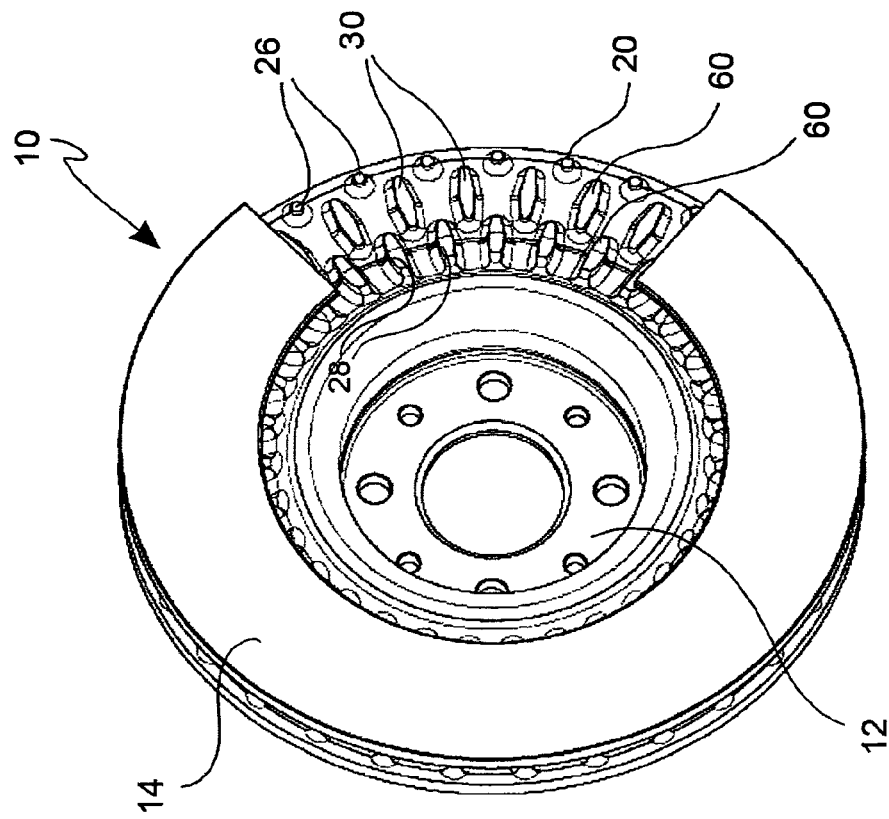
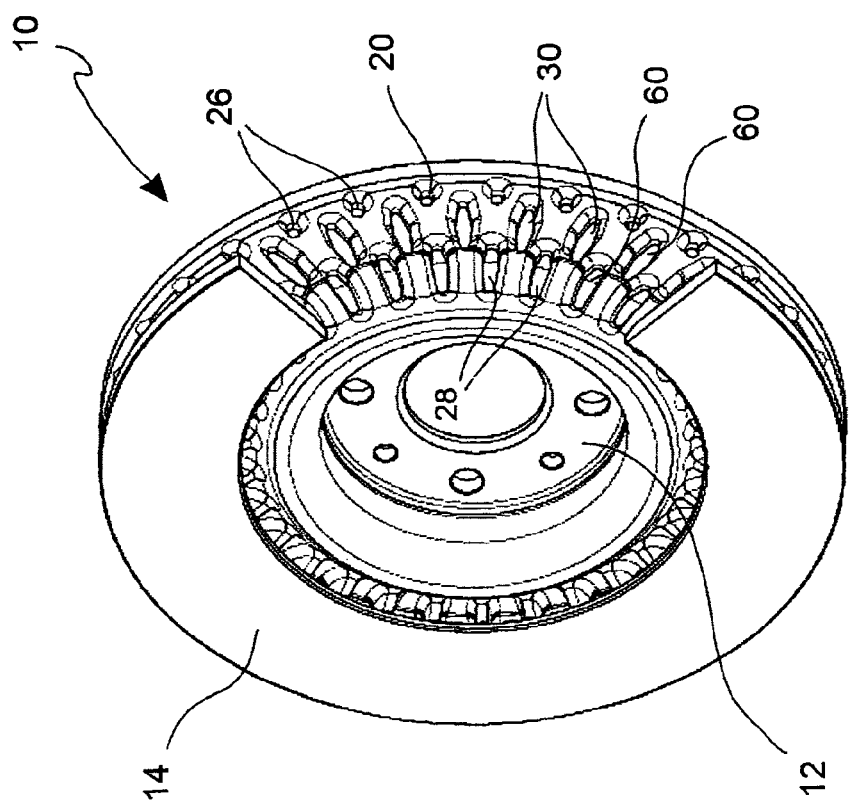
Fig. 8
Fig. 7

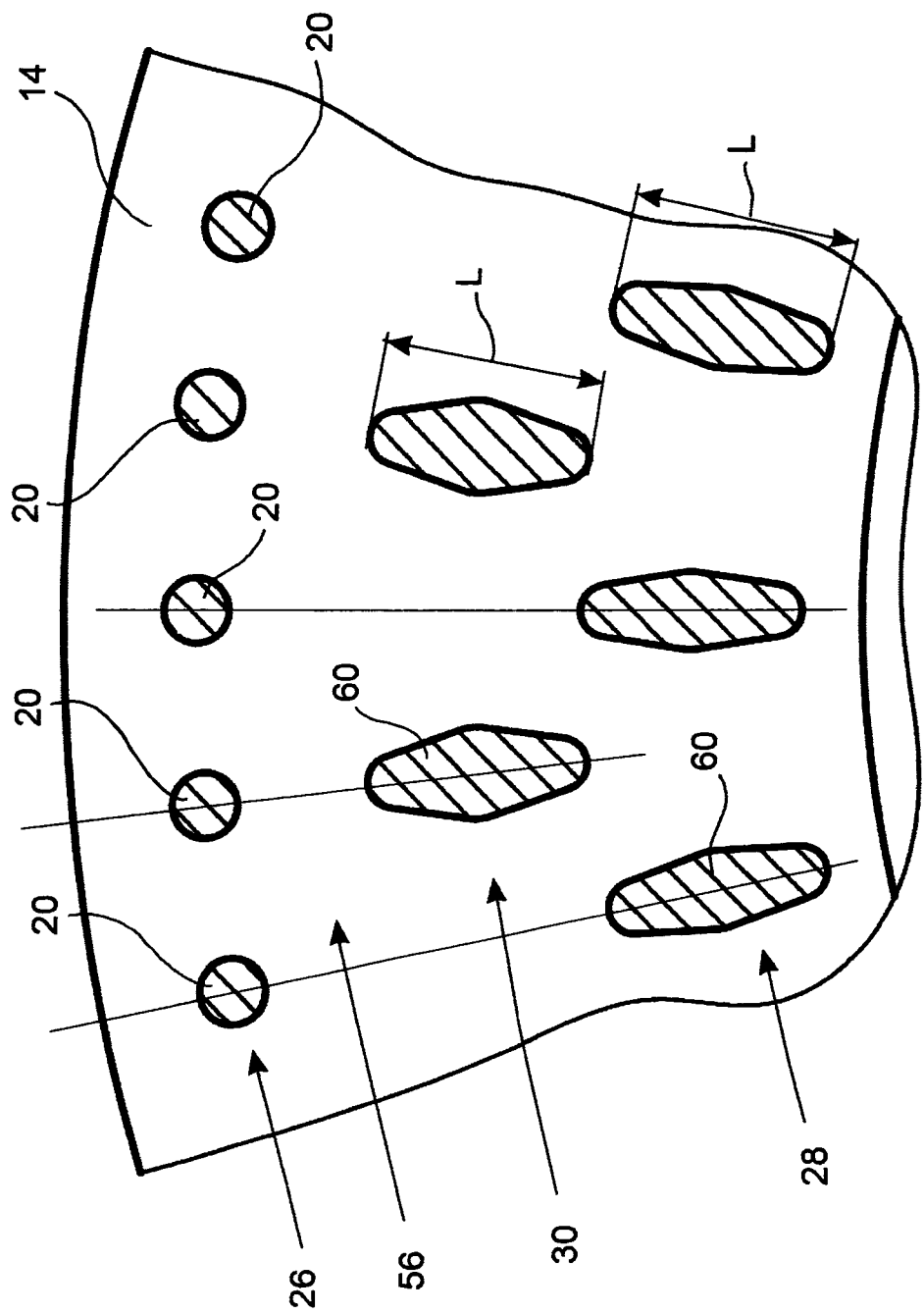

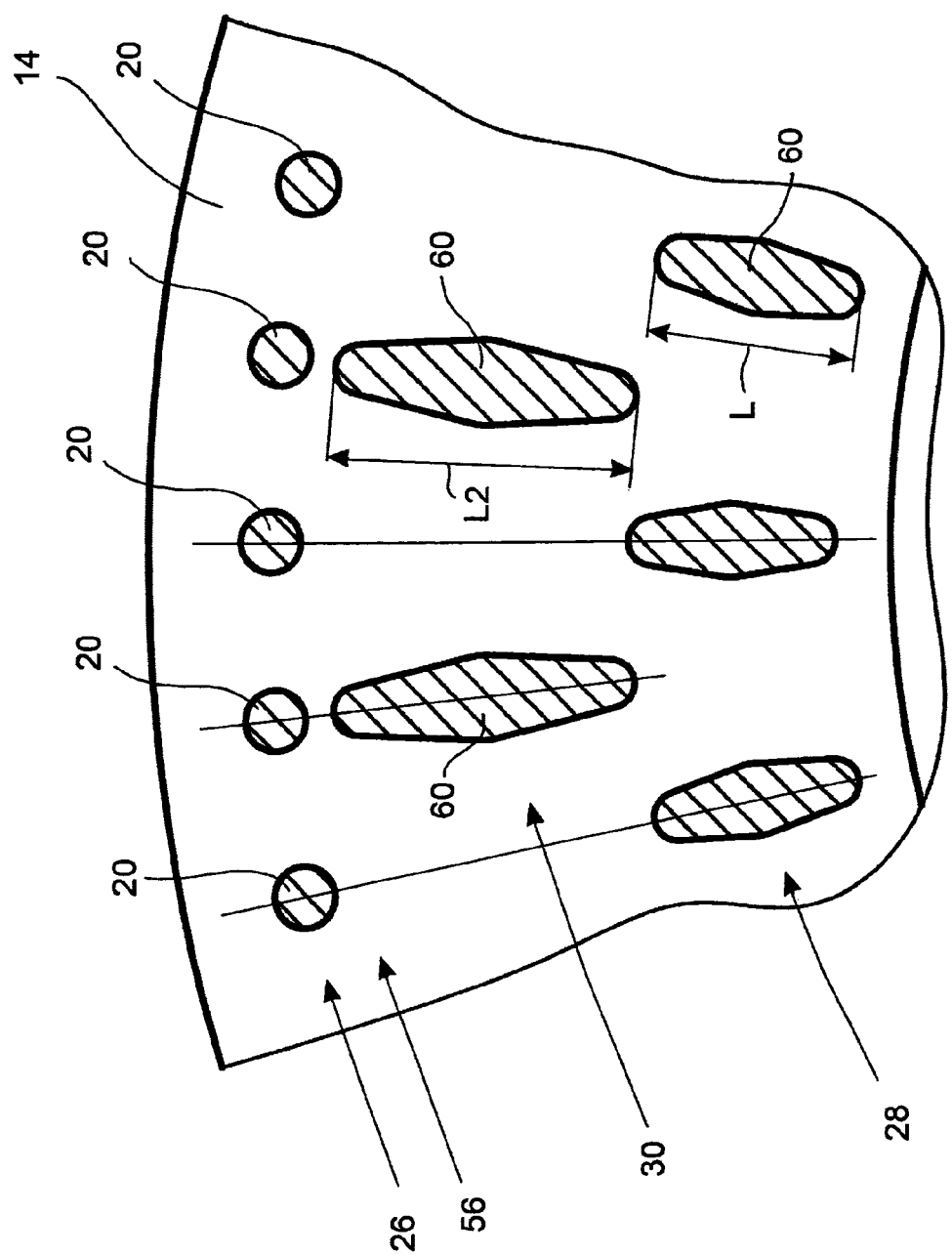

|  | STATE OF THE ART | INVENTION | |
| --- | --- | --- | --- |
|  | Freq. (Hz) | Freq. (Hz) | Dif. % |
| FIRST MODE (TWO LOBES) | 861 | 750 | -13,6 |
| SECOND MODE (THREE LOBES) | 2107 | 1786 | -15,3 |
| THIRD MODE (FOUR LOBES) | 3505 | 2937 | -16,2 |
| MODE CLOSE TO 9ND | 9500 | 9584 | 0,9% |
|  |  | 9725 | 2,4% |

Fig. 24

BRAKE BAND FOR A VENTILATED DISC BRAKE

The present invention refers to a brake band and to a disc for a ventilated disc brake, particularly, but not exclusively, for applications in the automobile industry.

As known, discs for a disc brake comprise a bell, suitable for associating the disc with a hub of a vehicle, from which an annular portion known as brake band extends, intended to cooperate with pads of a caliper. In the case of ventilated discs, the brake band is made with two plates respectively facing one another and connected together with connection elements, for example in the form of pins posts or tabs. The outer surfaces of the two plates define opposite braking surfaces, whereas the inner surfaces, together with the pins or tabs, define ventilation channels for cooling the disc crossed by the air according to a centrifugal direction during the rotation motion of the disc itself.

Said brake band is intended to cooperate with calipers for a disc brake suitable for exerting a braking action on the vehicle, exerting, through pads, friction on opposite surfaces of the two plates, known as braking surfaces.

It is known that, during the actuation of the brakes, the friction between the pads of the brake calipers and the braking surfaces of the braking band generates a large amount of heat that needs to be disposed of dissipate.

Indeed, the heat generated causes numerous undesired phenomena to occur, like for example the deformation of the braking band, the formation of cracks on the braking surfaces or localised transformations of state of the material constituting the braking band that in turn lead to the deterioration of the braking band itself.

In particular, in applications on high-performance vehicles having high braking efficiency, the energy to dissipate of is very high and the aforementioned need to dissipate of the heat generated during braking is even greater.

Ventilated discs of the type quoted above have undergone a continual evolution over time, in particular with regard to the number and configuration of the so-called ventilation channels, thus defining the gap that is formed by the two plates axially facing one another.

Among known ventilated discs, discs with so-called "posts" or "pins" have proven particularly effective, in terms of heat disposal performance, i.e. cooling, in which the ventilation channels are internally limited by particular column-shaped connection elements of limited or comparable radial and circumferential extension with respect to their axial extension, definable as "posts" or "pins", which connect the two plates transversally.

Ventilated discs with "pin" structures are known, for example, from WO 2004/102028, U.S. Pat. No. 4,865,167, WO 2009/136416 and from U.S. Pat. No. 5,542,503.

It is also known that the braking action performed by the pads against the braking surfaces of the disc generates heat, and consequently an increase in temperature of the disc until the disc itself is made incandescent in the case of particularly severe performance. Due to the high temperature reached by the disc during braking, the disc deforms and the contact between the pads and the braking surfaces deteriorates. Moreover, the friction material of the pads undergoes a sort of vitrification and pollution by the material of the disc.

It has also been found that the highest temperature is reached at a central annular portion of the braking surfaces, i.e. at a central annular portion of the outer surfaces of the respective plates. Through the lifetime of the disc, such an area can easily suffer from the formation of cracks.

In order to avoid the drawbacks outlined above, there is a particularly great need in the field, on the one hand, to increase the efficiency of the dispersion of heat generated by braking so as to keep down the temperatures reached by the disc during and following braking, and on the other hand, to increase the mechanical strength of these central portions of the brake band.

Solutions are known from WO 2004/102028 and also from WO 2002/064992, U.S. Pat. Nos. 7,066,306, 7,267,210, US 2006 0243546, US 2004 0124047, U.S. Pat. Nos. 6,367,599, 5,542,503 and 4,865,167. Although they are satisfactory from many points of view, these known solutions do not allow a compromise to be reached between the desired mechanical strength in the annular central area of the brake band and the contrasting need to maximise the flow of air in the same area that is able to remove the large increase in localised temperature caused by the braking action.

Nevertheless, it should be observed that ventilated discs of the quoted type do not per se offer a solution to a further problem, which occurs at the same time as the aforementioned problem and that must be solved simultaneously, a problem suffered by disc brakes, in particular disc brakes with ventilated discs, which will be briefly illustrated hereafter.

As known, during the actuation of the brakes, the disc and the brake bands, in particular, can mechanically vibrate, at different frequencies correlated to the different modes of vibration of the disc itself. Such vibrations of the disc can derive for example from resonances triggered by vibrations of objects, mechanically coupled with the disc, which are stressed during braking, if the vibration frequencies of such objects coincide with or are sufficiently close to the vibration frequencies of the disc itself.

It is also known that the aforementioned vibrations cause audible noise, in particular in the form of annoying whistles, when the resonance frequencies are within the audible range (for example, between 2 and 10 KHz, with consequent more or less acute whistles).

Consequently, there is a need to devise solutions to reduce or eliminate such whistles, through constructive provisions that "move" the vibration frequencies of the disc onto different values from those excited.

For discs with different structures from the quoted "pin" structures, some solutions are known.

For example, IT 1 273 754 has braking bands with projections jutting in the inner part of the plates, towards the gap between the two plates, in particular positions and with suitably identified masses in order to reduce the vibrations that occur and the consequent noise.

Other ventilated discs with structures suitable for reducing annoying vibration phenomena are known for example from U.S. Pat. No. 4,523,666.

The quoted known solutions do, however, refer to ventilated disc structures that, being totally different from the aforementioned "pin structures", are therefore unable to ensure the quoted advantages, especially in terms of cooling efficiency, which are now considered essential in numerous applications.

EP 1 373 751 B1 has ventilated discs "with pins" in which the pins are geometrically arranged along three concentric circumferences, coaxial to the disc and with a different radius, to form three "rows" or "tiers"; if sectioned in a plane parallel to the two plates and in the middle of them, the pins have different sections (for example, pins with "rhombus-shaped" sections in the intermediate and outer tiers; "droplet-shaped" pins in the inner tier). These discs equipped with droplet and rhombus-shaped pins, although satisfactory from other points of view, do not allow the possibility of facilitating the flow of cooling air that crosses the ventilation duct formed between the two plates of the disc to be combined with the reduction of the whistles caused by the vibration of the disc during the braking action.

U.S. Pat. No. 5,542,503 shows a geometry of a ventilated disc in which two plates are connected together by pins. A first arrangement of concentric pins close to the most outer diameter of the disc has pins with circular cross section separated by pins with droplet-shaped cross section, in which the portion of the droplet-shaped pins with prevalent circumferential extension is oriented towards the outer edge of the disc. A second row of concentric pins arranged closer to the rotation axis of the disc has pins with droplet-shaped cross section with the portion of the droplet-shaped pins with prevalent circumferential extension oriented towards the outer edge of the disc. A third row of concentric pins with droplet-shaped cross section, arranged even closer to the rotation axis of the disc, has the portion of the droplet-shaped pins with prevalent circumferential extension oriented towards the inner edge of the disc. Such a solution determines a flow path of the air from the ventilation channel formed between the two plates of the disc that is very winding causing a resistance to the flow of air from the outer edge of the disc. In particular, the sides elongated towards the axis of the disc of the droplet-shaped pins separated by the pins with circular section cause substantial problems for the flow of the air. Moreover, from tests carried out it has been seen how this geometry of the disc has modes of vibrating between 3 KHz and 10 KHz that are very close to one another and capable of amplifying a wide range of frequencies, making it easier for whistles to be produced during braking.

U.S. Pat. No. 4,865,167 shows a ventilated disc with plates connected by pins. A row of concentric pins is arranged close to the most outer diameter of the disc and has pins with droplet-shaped cross section in which the portion of the droplet-shaped pins with prevalent circumferential extension is oriented towards the outer edge of the disc. A second row of concentric pins closer to the axis of the disc has pins with rhombus-shaped section and a third row of concentric pins with droplet-shaped cross section, arranged even closer to the rotation axis of the disc, has the portions of the droplet-shaped pins with prevalent circumferential extension oriented towards the inner edge of the disc. This known solution, although satisfactory from many other points of view, does not simultaneously allow the cooling air to flow easily from the outer edge of the disc and at the same time allow the vibration modes of the disc to be moved apart so as to reduce the whistles generated by the braking action. A similar problem is encountered with the use of a solution as presented in EP 1 373 751.

WO 2009/136416 exhibits a solution of a disc with brake band having plates connected by pins. In this solution a first row of pins circumferentially aligned and arranged close to the most outer diameter of the disc, has a triangular cross section with base facing towards the outside of the disc and close with respect to each other that causes a desired partial blocking of the ventilation duct formed by the two plates in order to avoid material, such as stones flicked up by the vehicle, being able to insert itself and obstruct the ventilation duct. Of course, although very satisfactory from other points of view, this solution is less effective in facilitating the flow of air from the ventilation duct.

Therefore, there is a need for new structures of ventilated discs that are able, during braking, to simultaneously offer both particularly efficient cooling performance and properties of minimisation of vibrations and noise.

The aforementioned known examples of ventilated discs, and relative braking bands, are unable to adequately satisfy both of the quoted requirements.

The problem forming the basis of the present invention is therefore to devise a brake band and a disc for a disc brake, which have structural and functional characteristics such as to satisfy the aforementioned requirements and, at the same time, to avoid the quoted drawbacks with reference to the prior art.

Such a problem is, for example, tackled by selecting to start from "pin structures", substantially kept in order to ensure high cooling efficiency, and to work with precision on the geometry and the arrangement of the pins in order to achieve the further objective of eliminating the whistles and reducing noise.

Such a problem is solved by a brake band in accordance with claim 1.

In accordance with a general embodiment, a brake band of a disc for a ventilated disc brake extends between an inner diameter, close to a rotation axis of the brake band, and an outer diameter, far from said rotation axis of the disc.

Advantageously, said brake band comprises two plates facing one another and defining a gap, said plates being joined together by heat dissipation and connection means or elements.

Preferably, said connection means are shaped like small columns that project from one plate towards the opposite plate in the form of pins and remain completely inside said gap.

Advantageously, said pins are grouped in at least two rows or tiers arranged circumferentially, a first of said tiers being arranged radially further out far from said axis close to said outer diameter, a second of said tiers being arranged more on the inside in the radial direction or towards said axis with respect to said first tier.

Preferably, at least two of said pins of said at least one first tier have, in un plane substantially parallel to the flow of air along the ventilation channels, a circular-shaped section.

Advantageously, some of the pins arranged in said second tier have, in un plane substantially parallel to the flow of air along the ventilation channels, a rhombus or diamond-shaped section with four vertices joined by four sides in which said side defining said section are substantially rectilinear in shape.

In accordance with a further general embodiment, a brake band comprises pins with circular section grouped according to a module that repeats circumferentially in the brake band.

In accordance with an embodiment, said module repeats according to different angles from 90 degrees, advantageously each on after a variable angle of from 91 to 95 degrees and preferably 92° 54'12".

Advantageously, there are three of said circular pins. Preferably, two of said pins with circular section are foreseen consecutive and arranged in the radially most outer tier, whereas the third pin with circular section of the module is foreseen in the radially intermediate tier and arranged radially between the two pins with circular section of the radially most outer tier.

In accordance with an embodiment, the remaining pins have sections with a different shape to circular.

Advantageously but not necessarily, the pins of the radially most outer tier not belonging to the module are pins having a section, in a plane substantially parallel to the flow of air along the ventilation channels, shaped like a droplet, having two rectilinear sides converging in the inward radial direction joined together by arcs of circle.

In accordance with an embodiment, all of the other pins of the intermediate tier not belonging to said module have, in a plane substantially parallel to the flow of air along the ventilation channels, a rhombus-shaped section.

In accordance with an embodiment, all of the pins belonging to the radially most inner tier have a rhombus-shaped section.

In accordance with a general embodiment, a brake band comprises pins arranged over three tiers, the pins of the radially most outer tier all have a circular section, in a plane substantially parallel to the flow of air along the ventilation channel, the pins of the intermediate tier all have a section, in a plane substantially parallel to the flow of air along the ventilation channel, shaped like a rhombus, rhombus with four vertices joined by four sides in which said sides defining said section are substantially rectilinear in shape, and said radially inner tier has all of the pins with a section, in a plane substantially parallel to the flow of air along the ventilation channel, shaped like a rhombus with four vertices joined by four sides, in which said sides defining said section are substantially rectilinear in shape.

In accordance with an embodiment, all of the pins of the radially intermediate tier and of the radially inner tier have the same extension or height in the radial direction, preferably creating a gap between the radially intermediate tier and the radially outer tier without pins in the circumferential direction and suitable for making cooling fluid pass at least partially and for at least one arc portion, in the circumferential direction.

In accordance with an embodiment, the pins with rhombus-shaped section of the radially intermediate tier have a greater dimension or height in the radial direction with respect to the dimension or radial height of the rhombus-shaped pin of the radially inner tier.

In accordance with a general embodiment, a brake band comprises three tiers of pins, the radially most outer tier has all of its pins with circular section, in a plane substantially parallel to the flow of air along the ventilation channel, the radially intermediate tier has all of its pins having a section, in a plane substantially parallel to the flow of air along the ventilation channels, shaped substantially like a diamond or rhombus with four vertices joined by four sides in which said sides defining said section are concave in shape to form a star shape or star-shaped pin, and said radially inner tier has all of its pins with a section, in a plane substantially parallel to the flow of air along the ventilation channels, shaped like a rhombus or diamond with four vertices joined by four sides, in which said sides defining said section are substantially rectilinear in shape.

Further characteristics and advantages of the brake band of a disc for a ventilated disc brake according to the invention shall become clear from the following description of preferred embodiments, given for indicating and not limiting purposes, with reference to the attached figures, in which:

FIGS. 7 and 8 show partially sectioned perspective views of a disc for a disc brake in which a further embodiment of the pin arrangement in concentric tiers is foreseen;

FIG. 19a illustrates a front view of the disc of FIGS. 17 and 18 in which the brake band is partially sectioned to show the sections of the pins arranged in tiers highlighting a module made up of circular pins;

FIG. 19b illustrates a detail of FIG. 19a;

FIG. 22 illustrates a detail of a brake band in section along the middle plane of the flow of fluid in the gap that highlights the sections of the pin arrangement according to a further embodiment;

FIG. 23 illustrates a detail of a section along a middle plane of the flow of fluids in a gap of a ventilated brake band highlighting the sections of the pins arranged connecting the two plates;

FIG. 24 illustrates a table in which the frequencies of the modes of vibration of a solution according to the state of the art given by EP1373751 and the present invention are compared.

Figure 1:
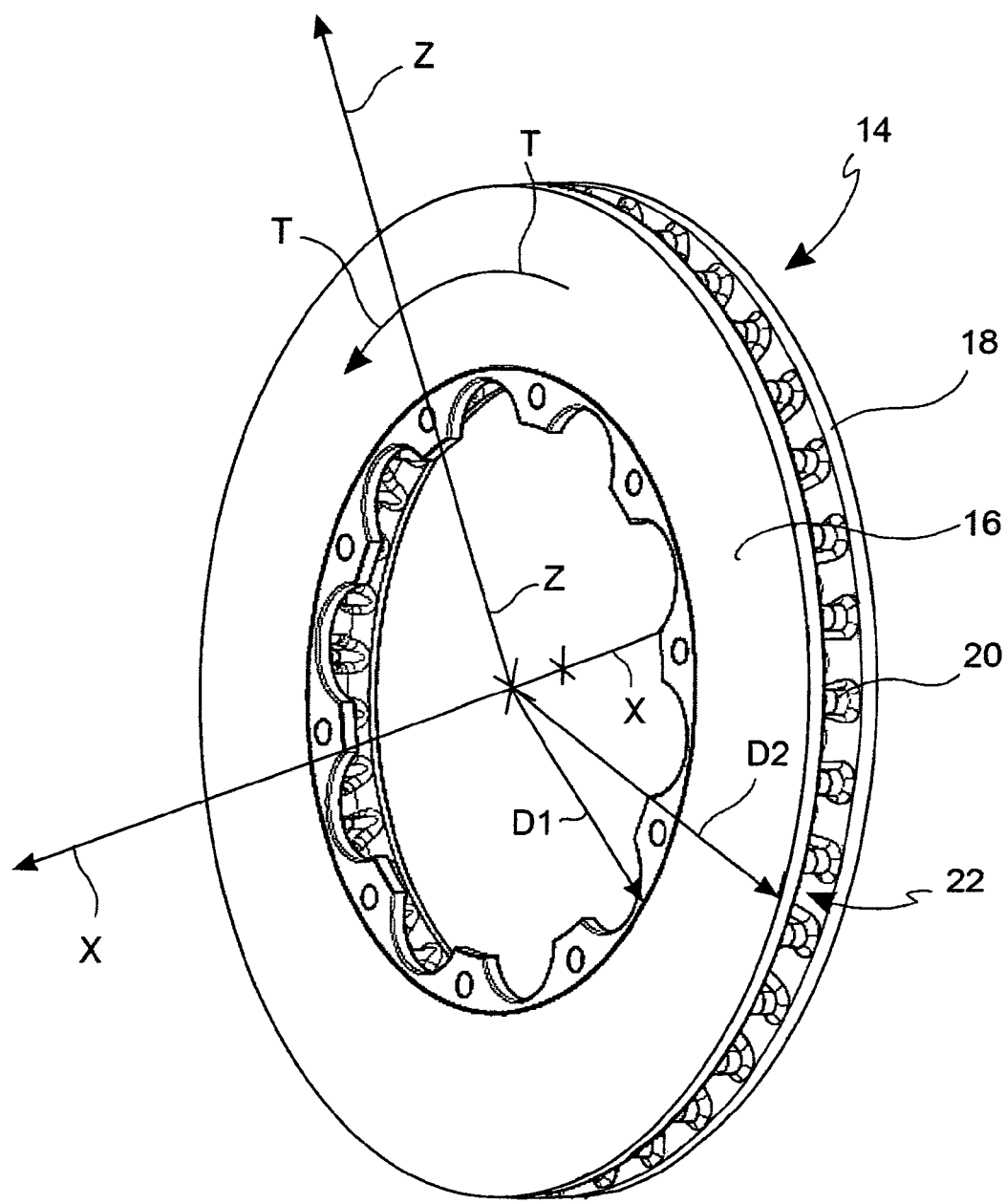
FIG. 1 represents a perspective view of a brake band suitable for being connected to a bell for connecting to a hub of a vehicle.
Figure 3:
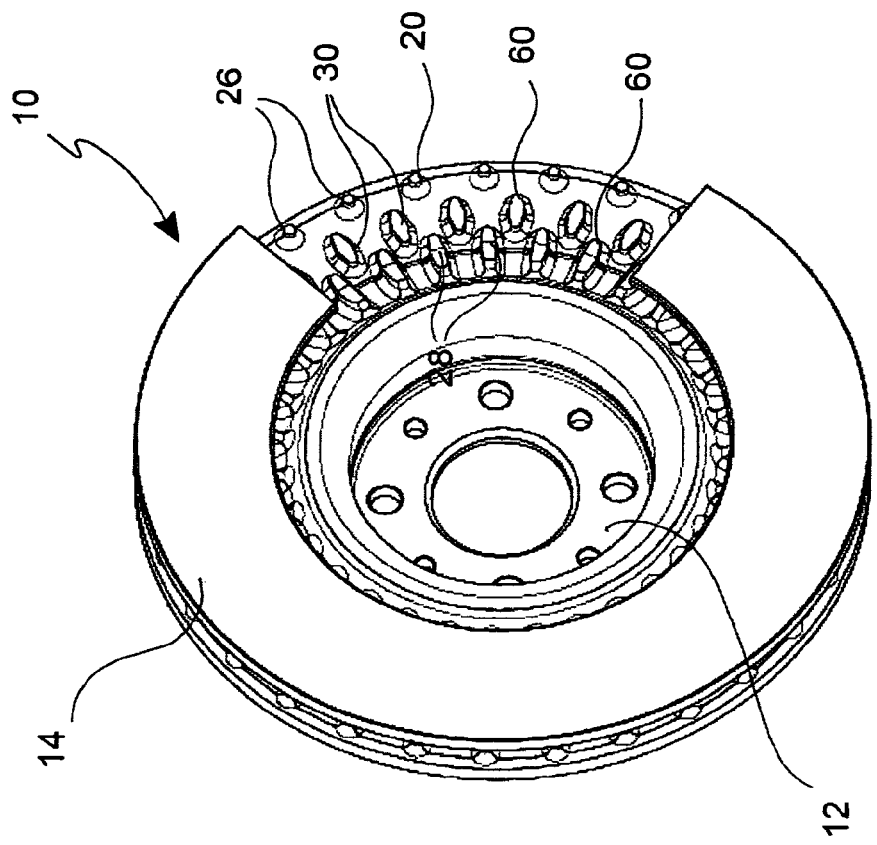
FIGS. 2 and 3 illustrate axonometric views partially sectioned of a disc for a disc brake, in which the ventilated brake band has a gap connected by pin elements arranged over concentric tiers.
Figure 2:
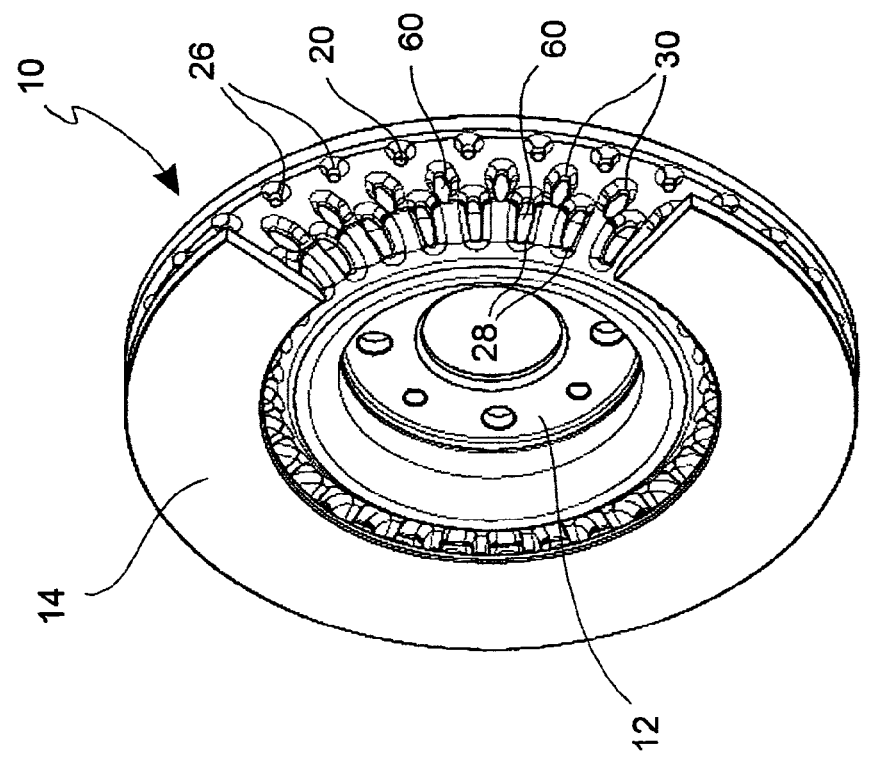
Figure 4:
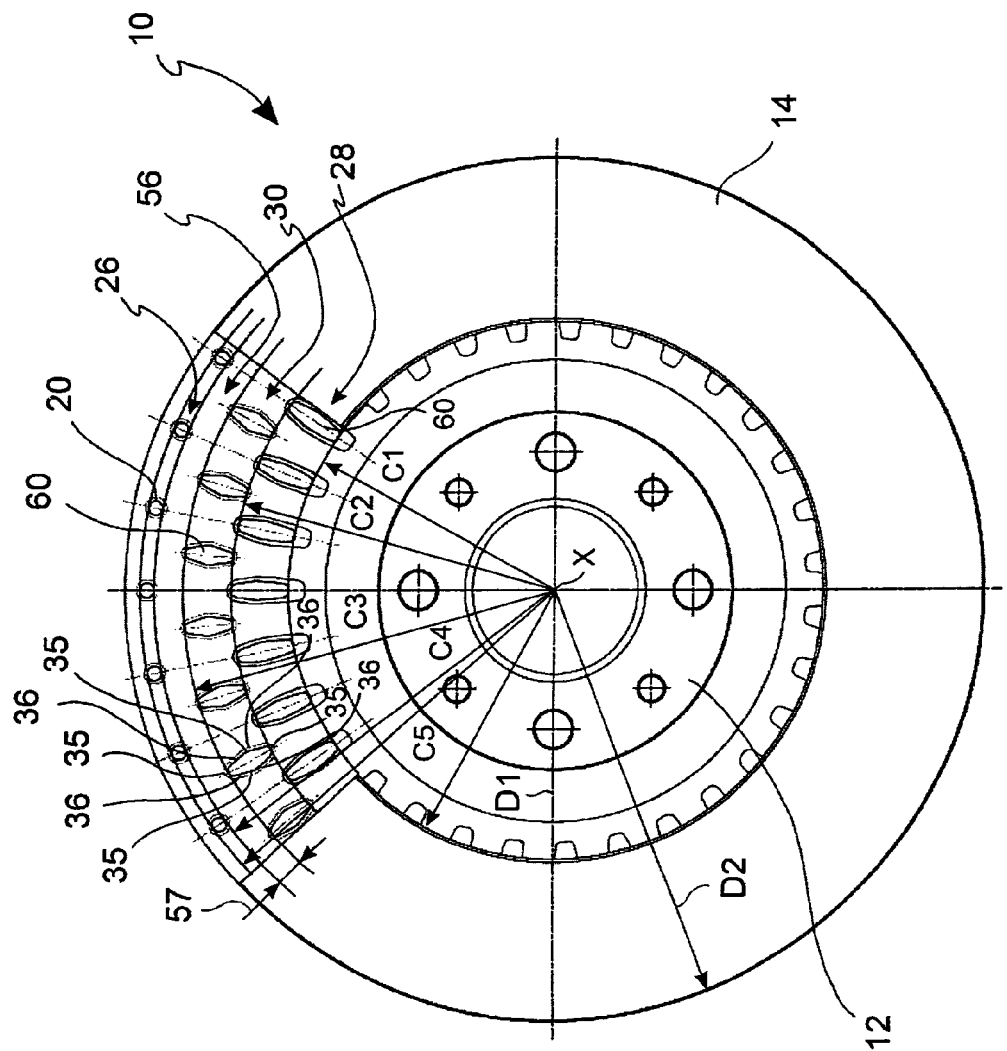
FIG. 4 represents a front view of the disc of FIGS. 2 and 3 with its brake band partially sectioned and highlighting the three tiers of pins and their circumferential and radial arrangement.
Figure 6:
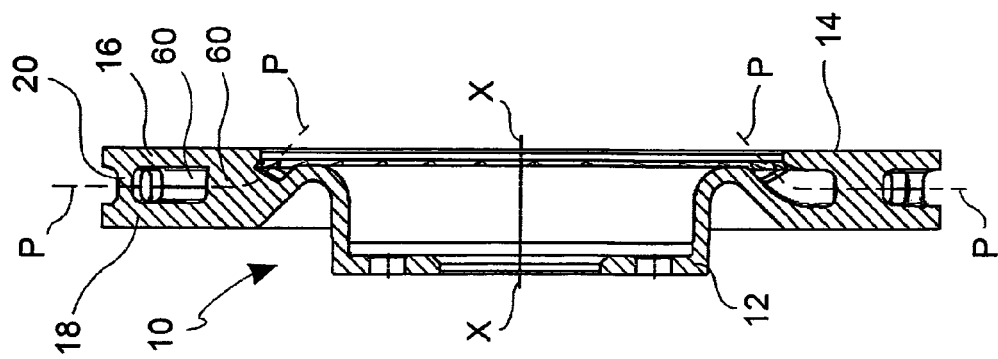
FIG. 6 represents the section along the line VI-VI of FIG. 5, from which it is in particular possible to see the arrangement of the middle plane of the flow of fluid inside the gap of the brake band.
Figure 5:
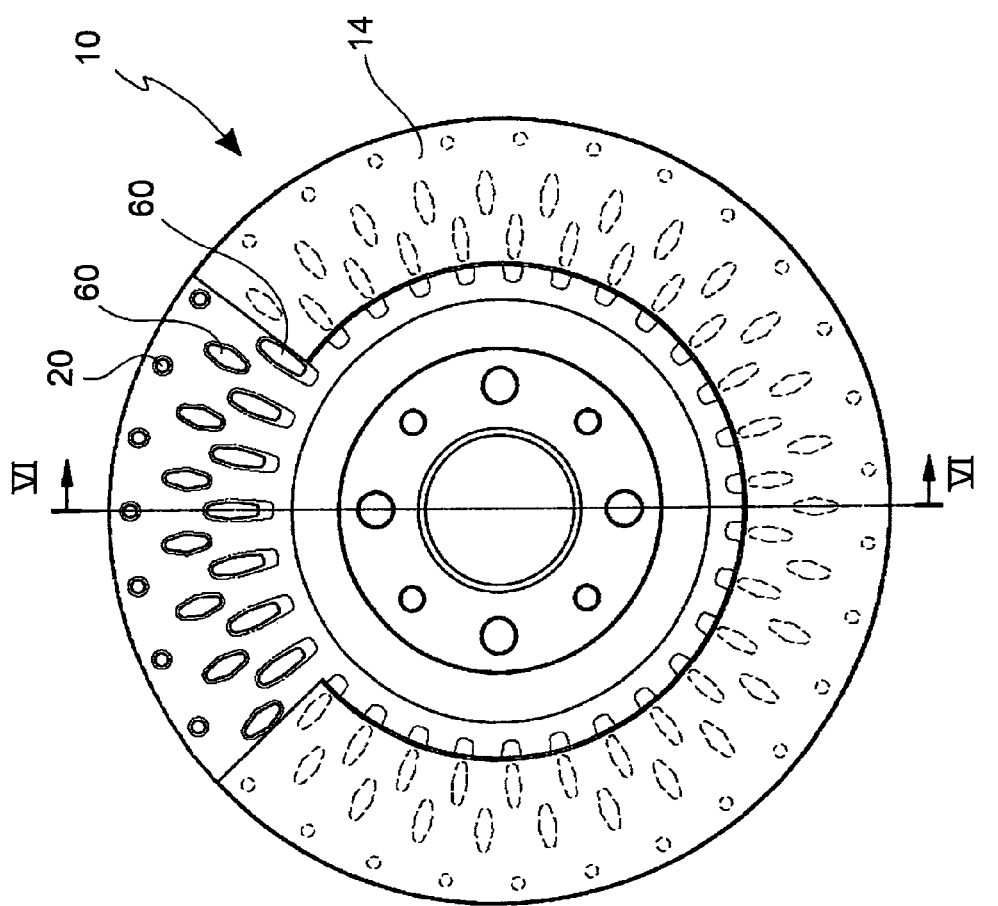
FIG. 5 shows another front view of the disc of FIG. 4 in which, thanks to a partial section, it is possible to see some of the pins arranged connecting the two plates of the brake band, whereas the other pins are represented with broken lines.
Figure 9:
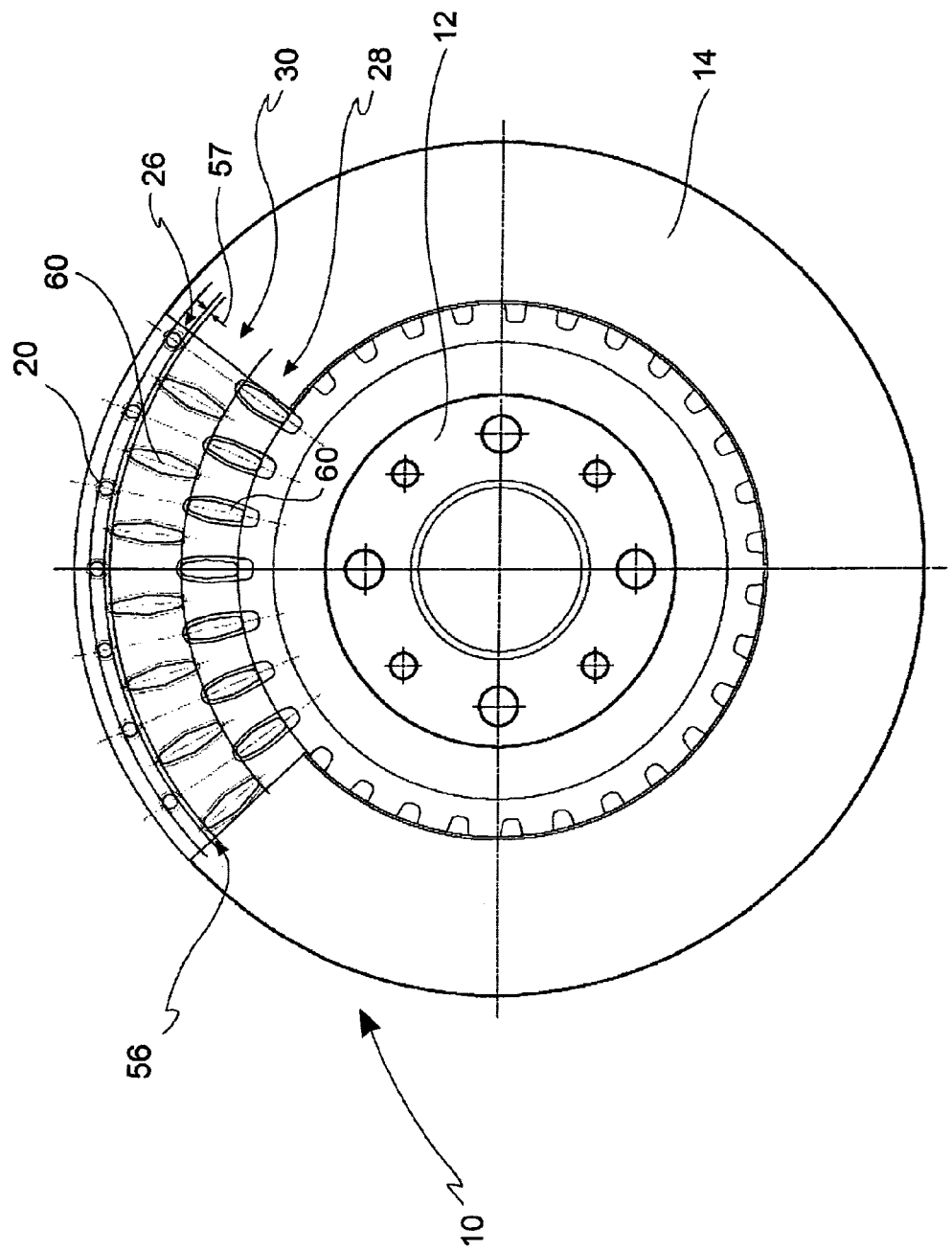
FIG. 9 represents a front view of the disc of FIGS. 7 and 8 in which in the partially sectioned portion of the brake band the sections of the pins are shown.
Figure 11:
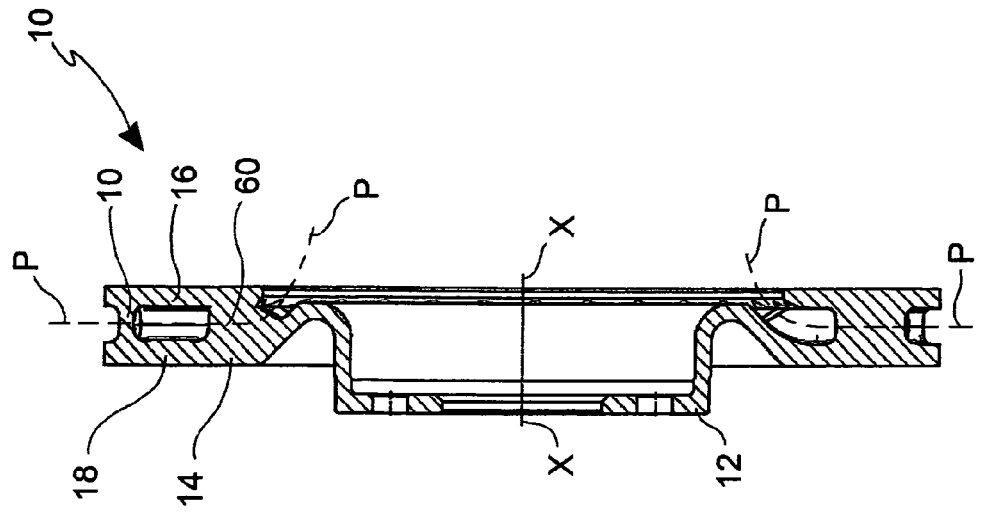
FIG. 11 represents the section according to the line XI-XI of the disc of FIG. 10.
Figure 10:
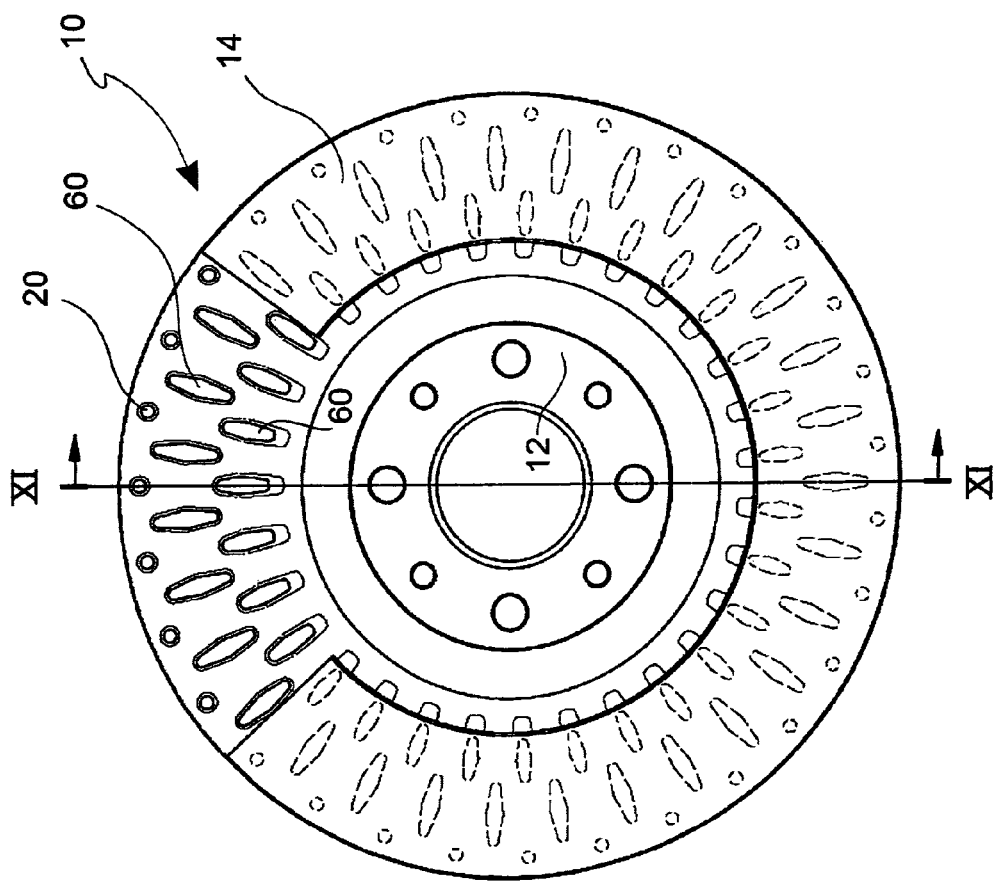
FIG. 10 illustrates a front view of the disc of FIG. 9 showing, in a partially sectioned portion of the brake band, the sections of the pins and the remaining pins are indicated with a broken line.
Figure 13:
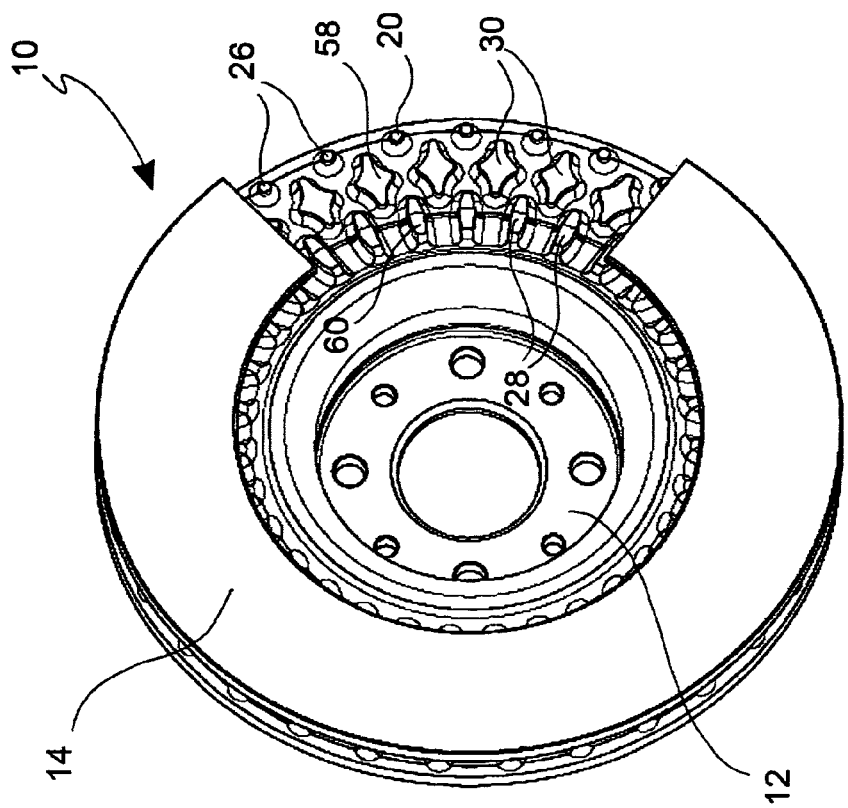
FIGS. 12 and 13 illustrate perspective views according to different angles of view of a disc for a disc brake in which a portion of the brake band is partially sectioned to show the pin arrangement.
Figure 12:
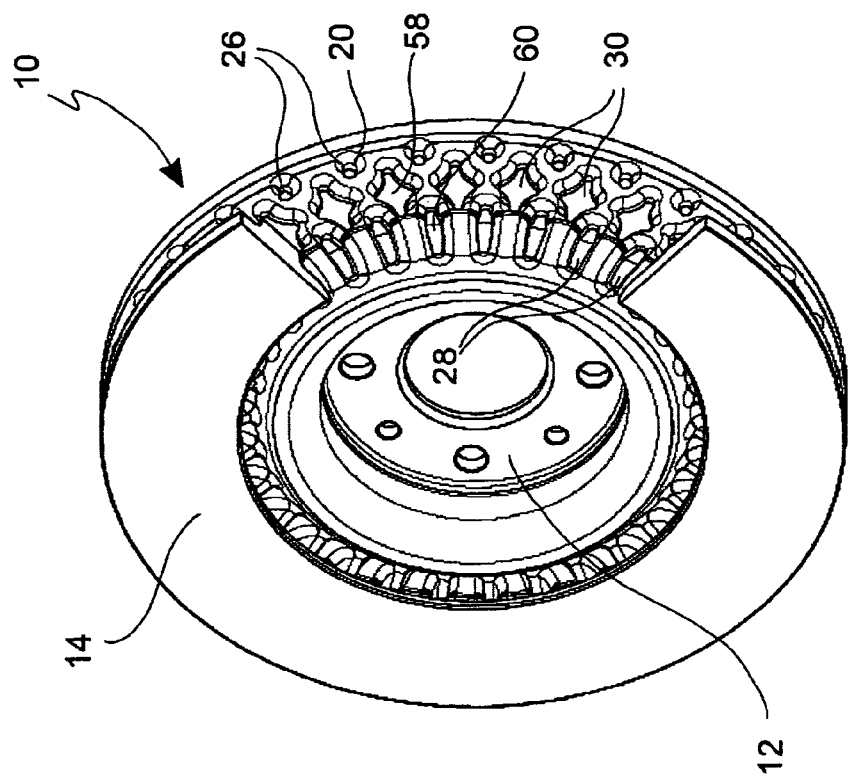
Figure 14:
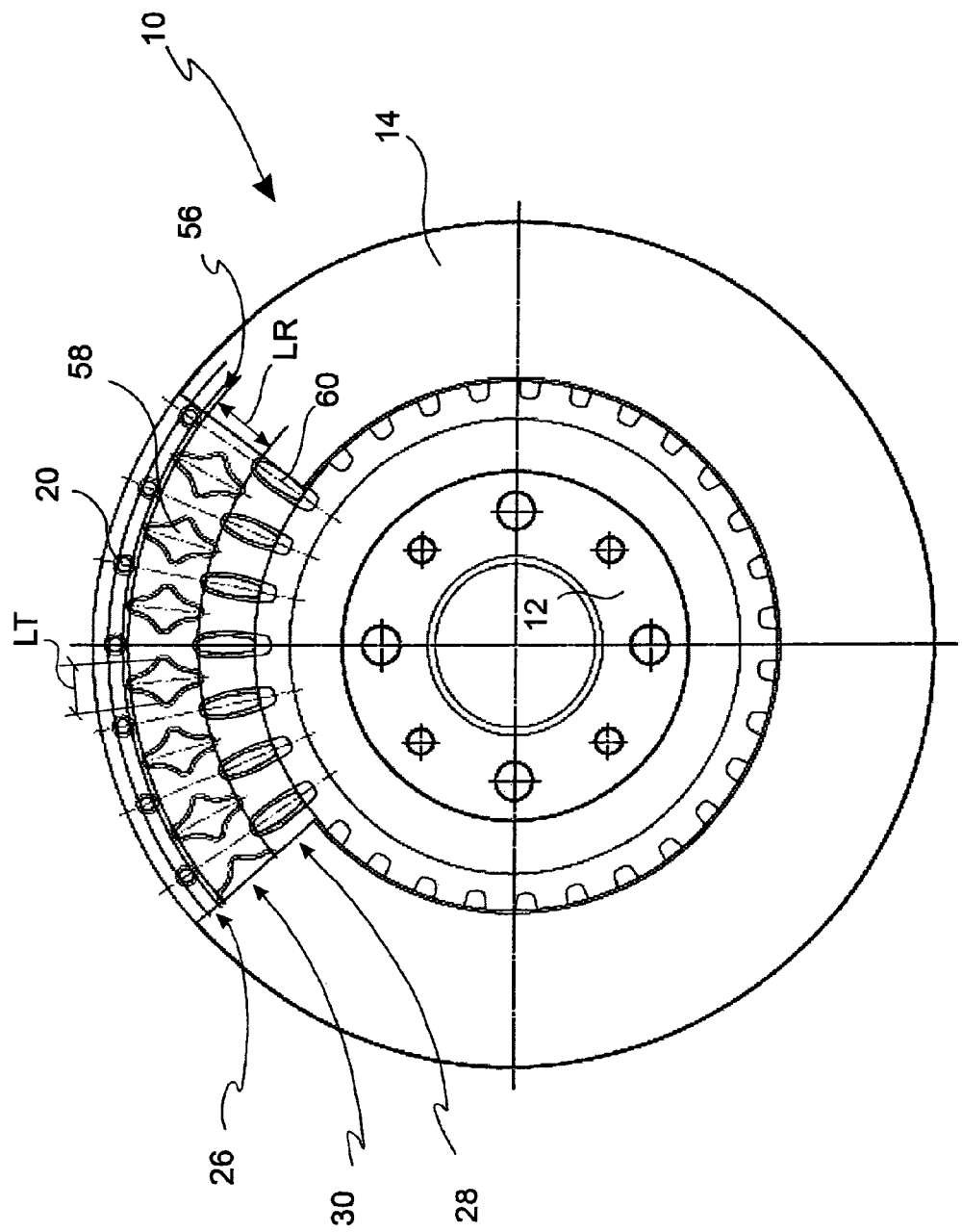
FIG. 14 illustrates a front view of the disc of FIGS. 12 and 13, in which the brake band is partially sectioned showing the arrangement of the pins in tiers.
Figure 16:
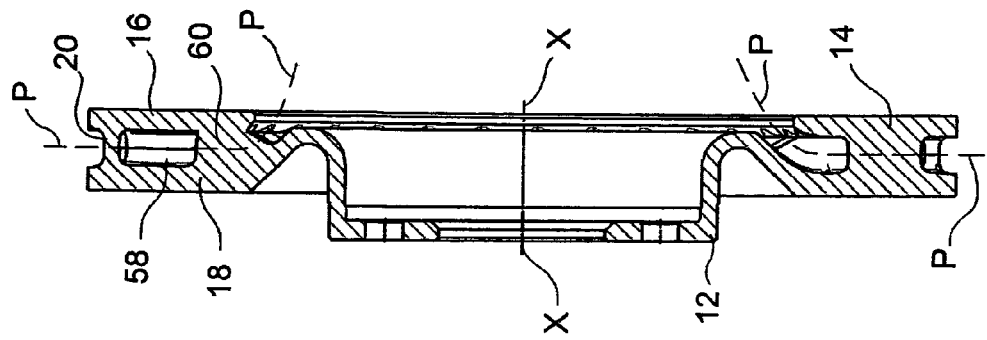
FIG. 16 represents the section of line XVI-XVI of FIG. 15.
Figure 15:
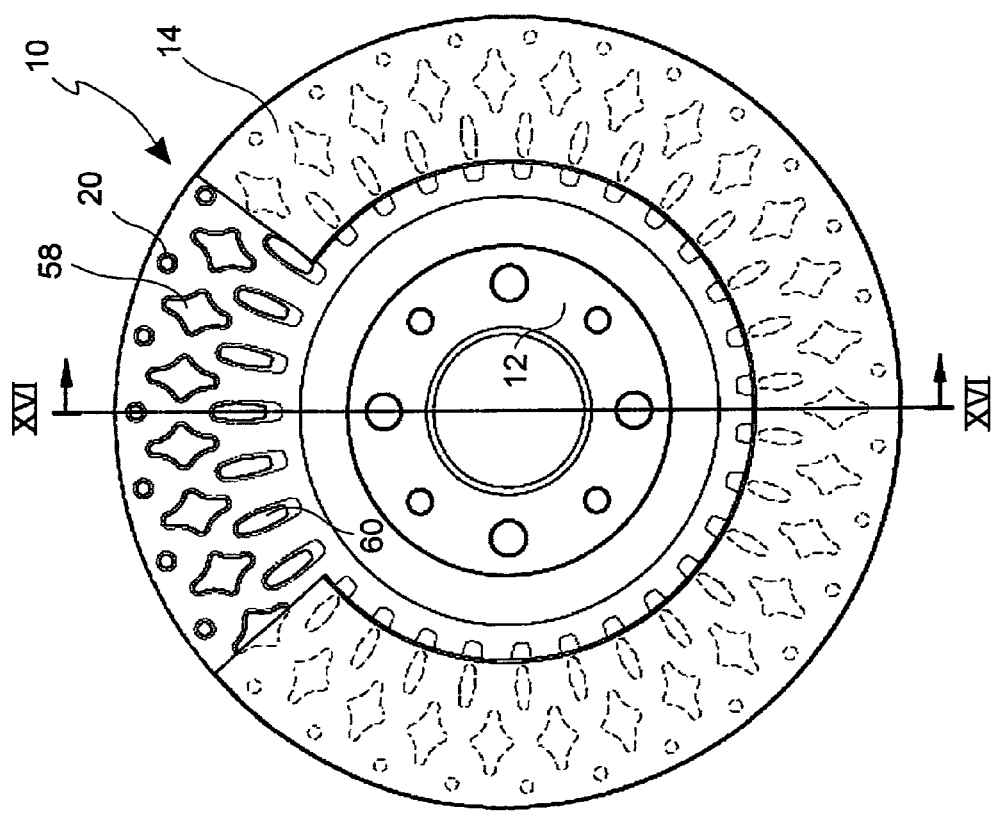
FIG. 15 illustrates the disc of FIG. 14 in which in its partially sectioned portion the sections of some pins are placed in view whereas the remaining pins are represented with a broken line.
Figure 17:
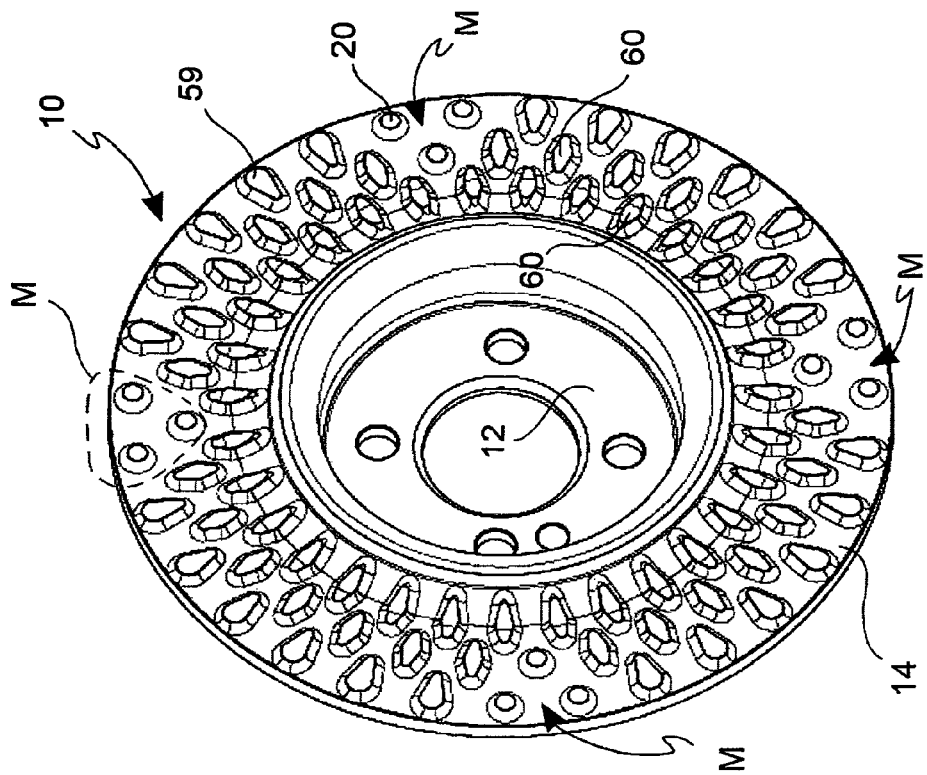
FIGS. 17 and 18 show perspective views according to different angular positions of a disc for a disc brake sectioned along the middle plane of a flow of the fluid in the gap of the brake band placing the sections of the pin arrangement in view.
Figure 18:
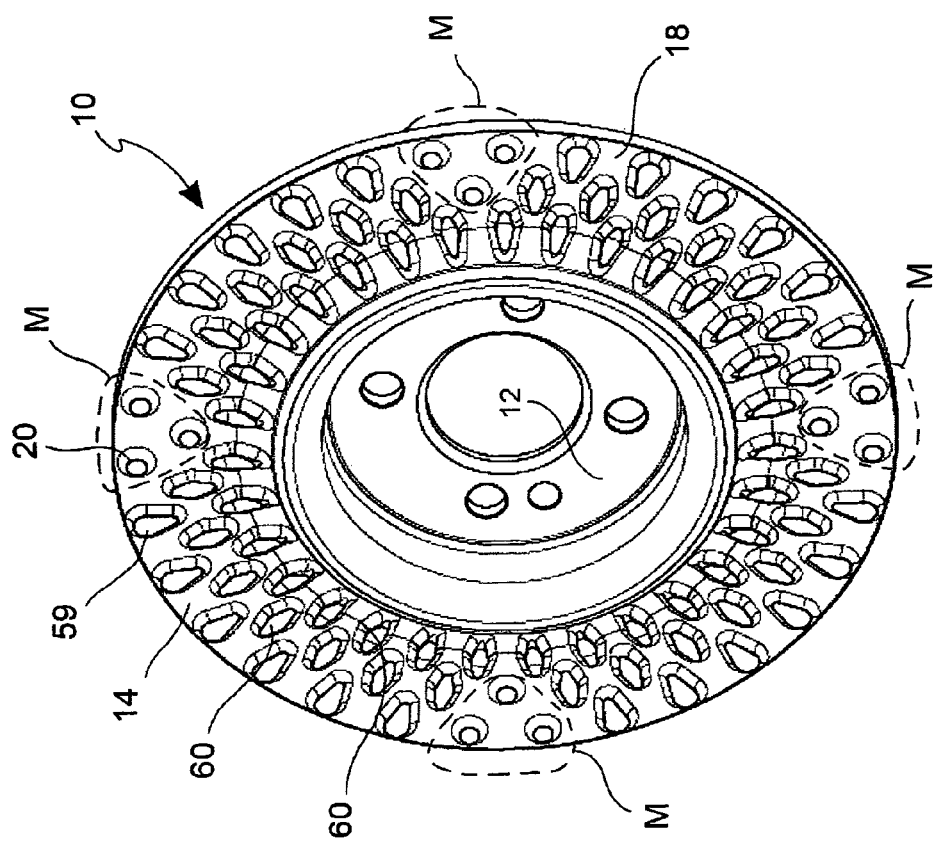
Figure 19:
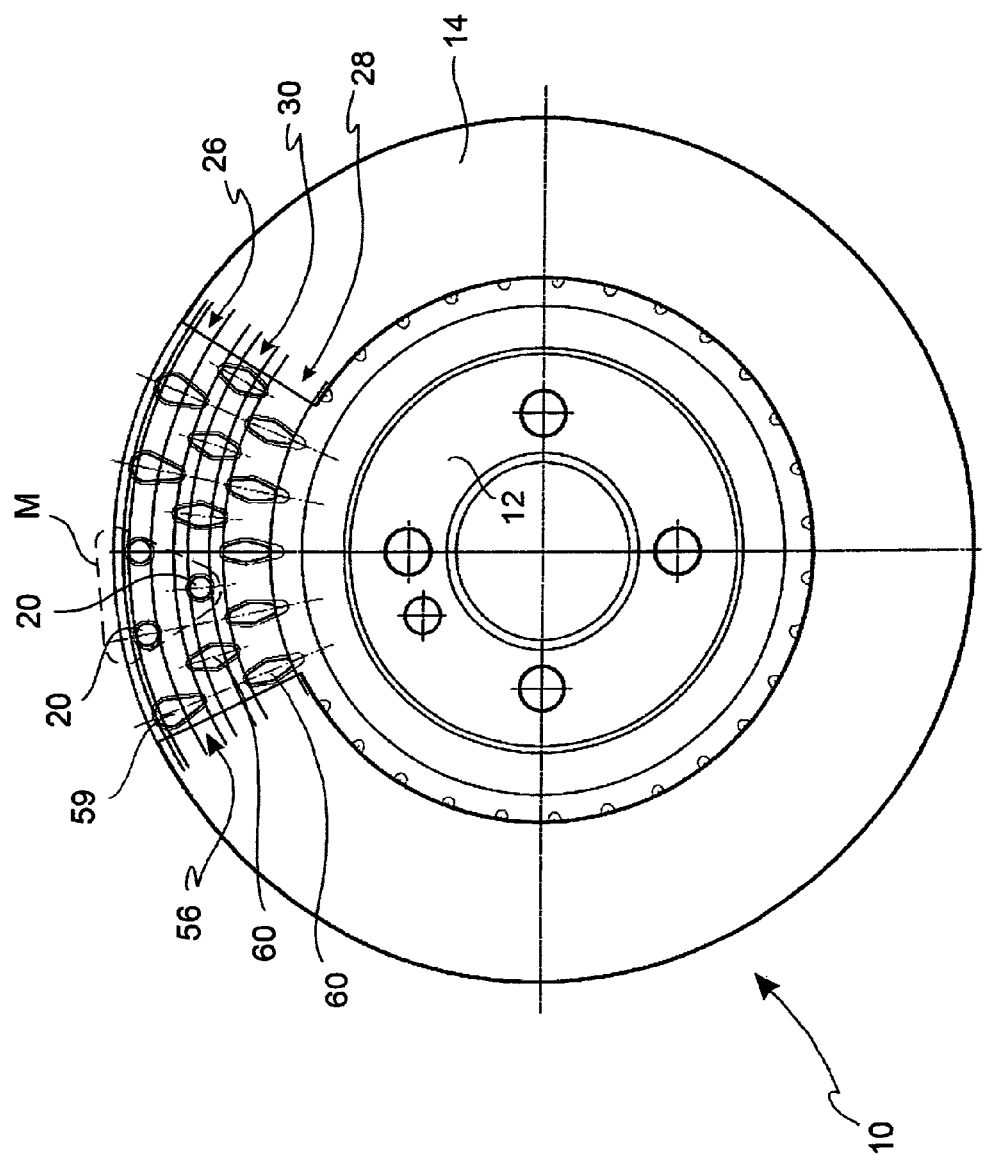
Figure 19:
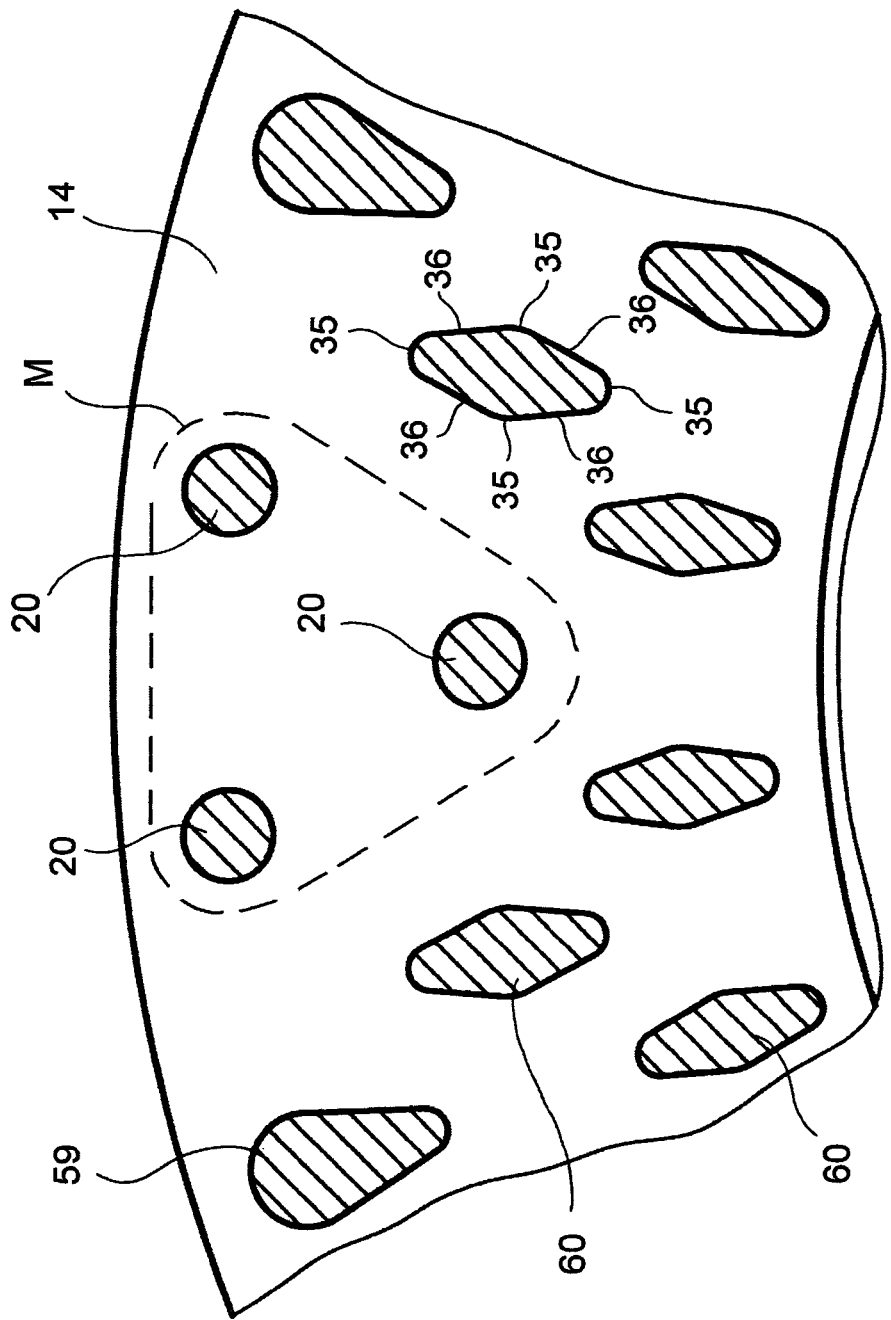
Figure 21:
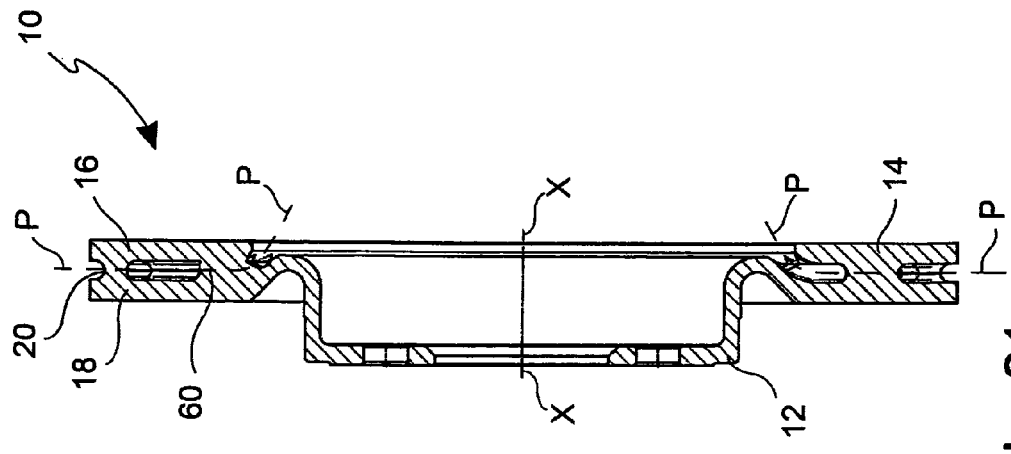
FIG. 21 illustrates a section along the line XXI-XXI of FIG. 20.
Figure 20:
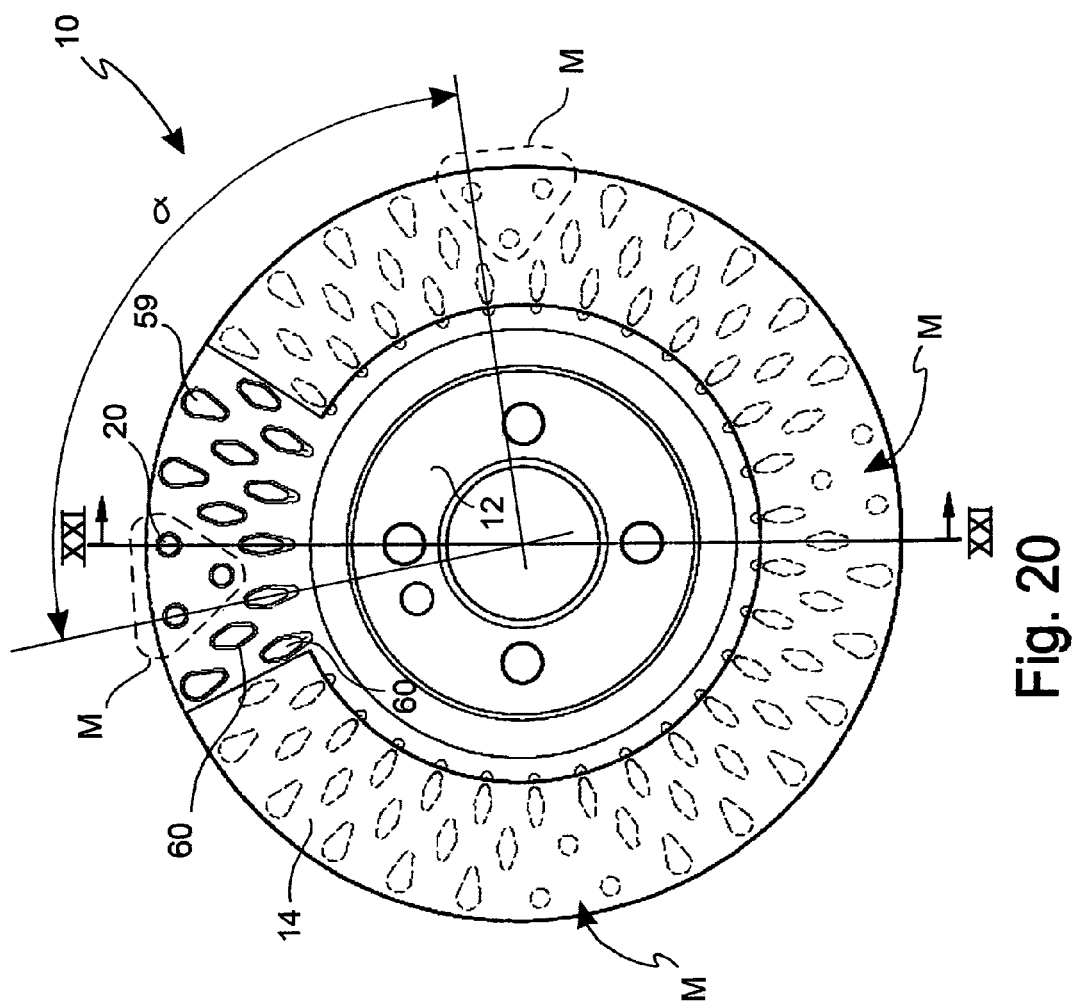
FIG. 20 illustrates a front view of the disc of FIG. 19a, in which in a partially sectioned portion of its brake band the sections of the pins are highlighted, whereas the remaining pins are represented with broken lines.

With reference to the aforementioned figures, a disc for a ventilated disc brake has been wholly indicated with 10. A bell has been indicated with 12 and a brake band has been indicated with 14.

Reference symbol X-X indicates an axis around which the disc rotates.

By direction axial to the disc or to the brake band we mean a direction parallel to the axis X-X.

Reference symbol Z-Z generically indicates a direction radial to the disc or to the brake band, i.e. a direction perpendicular to the axial direction or to the axis X-X.

By direction tangential T-T or circumferential to the disc we mean a direction tangent to a circumference having its centre on the axis X-X and lying on a plane perpendicular to it or a circumferential trajectory.

The brake band 14 extends between an inner diameter D1, close to the rotation axis of the disc X-X, and an outer diameter D2, far from said rotation axis of the disc X-X.

The brake band comprises two plates 16 and 18 joined by connection means for example in the form of pins 20 and/or 60 and/or 59 and/or 58. Between the two plates 16 and 18 a gap 22 is defined that is divided into ventilation channels by the connection means.

Of the two plates, the one that is located on the same side as that in which the bell extends, with respect to a middle plane P-P, or middle plane of flow of the fluid in the gap, arranged between the two plates has been indicated with 18, whereas the one that is located on the opposite side to that in which the bell extends, with respect to a aforementioned middle plane P-P of the gap between the two plates has been indicated with 16.

In accordance with an embodiment, a brake band of a disc 10 for a ventilated disc brake extends between an inner diameter D1, close to a rotation axis X-X of the brake band 14, and an outer diameter D2, far from said rotation axis X-X of the disc.

Advantageously, said brake band 14 comprises two plates 16, 18 facing one another and defining a gap 22. In accordance with an embodiment, said plates 16, 18 are joined together by heat dissipation means or elements or connection means 20, 58, 59, 60. Advantageously, said connection means 20, 59, 60 are shaped like small columns that project from one plate towards the opposite plate in the form of pins 20, 58, 59, 60 remaining inside said gap 22, preferably completely inside said gap considering the middle plane P-P of flow of the fluid in the gap.

In accordance with an embodiment, said pins 20, 59, 60 are grouped in at least two rows or tiers 26, 28, arranged circumferentially.

In accordance with an embodiment, a first of said tiers 26 is arranged radially more to the outside or far from said axis X-X, close to said outer diameter D2.

In accordance with an embodiment, a second of said tiers 28 or 30 is arranged more to the inside in the radial direction or towards said axis X-X with respect to said first tier 26.

In accordance with an embodiment, at least two of said pins 20 of said at least one first tier 26, in a plane P-P substantially parallel to the flow of air along the ventilation channels, have a circular-shaped section.

In accordance with an embodiment, some of the pins 60 arranged in said second tier 28 or 30 have, in a plane P-P substantially parallel to the flow of air along the ventilation channels, a rhombus or diamond-shaped section with four vertices 35 joined by four sides 36. Said sides 36 define said section and are substantially rectilinear in shape.

In accordance with an embodiment, said two pins 20 with circular-shaped section are arranged contiguous to one another.

In accordance with an embodiment, there are many rows or tiers 26; 28; 30 of pins, said many tiers are arranged concentric to one another and each pin is offset with respect to the pins closest to the adjacent tiers in a quincunx arrangement.

In accordance with an embodiment, all of the pins 20 of said radially outer first tier 26 have, in a plane P-P substantially parallel to the flow of air along the ventilation channels, a circular section.

In accordance with an embodiment, every tier 26, 28, 30 of pins has the same number of pins 20, 59, 58, 60 as the other tiers.

In accordance with an embodiment, there are three rows or tiers 26, 28, 30 of pins, defining a radially most outer tier 26, a radially intermediate tier or intermediate tier 30 and a radially inner tier or inner tier 28.

In accordance with an embodiment, the number of pins with circular section or circular pins 20 of the radially most outer tier or outer tier 26 is double the number of pins of the most adjacent tier 28, 30 and some of these pins with circular section or circular pins 20 radially overlap the pins 58, 59, 60 of the adjacent tiers 28, 30.

In accordance with an embodiment, the radially most inner row or tier or inner tier 28 has all of the pins having, in a plane P-P substantially parallel to the flow of air along the ventilation channel, a section shaped like a rhombus 60.

In accordance with an embodiment, the radially intermediate row or tier 30 has all of its pins with section, in a plane P-P substantially parallel to the flow of air along the ventilation channels, shaped like a rhombus 60.

In accordance with an embodiment, at least some of the pins 58 have, in a plane P-P substantially parallel to the flow of air along the ventilation channel, a section shaped substantially like a rhombus or diamond, with four vertices joined by four sides, in which said sides defining said section are concave in shape to form a star shape.

Preferably, the pins arranged in the intermediate row or tier 30 all have a star-shaped section 58.

In accordance with an embodiment, the radially most outer tier 26 has pins with a cross section, in a plane P-P substantially parallel to the flow of air along the ventilation channel, that is circular in shape and pins 59 with a section, in the same plane P-P substantially parallel to the flow of air along the ventilation channels, shaped like a droplet comprising two sides converging in the radially inward direction and rectilinear, joined together by arcs of circle.

In accordance with an embodiment, all of the pins 59 that do not have a circular section 20 have a droplet-shaped section 59.

In accordance with an embodiment, there are many rows or tiers 26; 28; 30 of pins, said many tiers being arranged concentric to one another, and in which the tier 26 arranged close to the outer diameter D2, far from said rotation axis X-X of the disc, has at least some of the pins with substantially triangular cross section with base facing towards the outside of the disc and sides inside the ventilation channel having a concave profile. In accordance with an embodiment, in said triangular sections said sides comprise at least one portion consisting of an arc of circumference.

In accordance with an embodiment, between said tiers of pins 26, 28, 30, and in particular between said radially outer tier 26 and said intermediate tier 30 there is a circumferential gap 56 or circumferential ring free from pins in the circumferential direction. In accordance with an embodiment, said circumferential gap 56 has greater radial extension 57 than the radial extension of the pin with circular section 20 foreseen in the radially most outer tier 26, or diameter of the circular section.

In accordance with an embodiment, said circumferential gap 56 has a shorter radial extension 57 than the radial extension of the pin with circular section 20 foreseen in the radially most outer tier 26.

In accordance with an embodiment, said pins with circular section 20 are grouped according to a module M that repeats circumferentially in the brake band 14.

In accordance with an embodiment, two of said pins with circular section 20 are foreseen consecutive and arranged in the radially most outer tier 26.

In accordance with an embodiment, the third pin with circular section 20 of the module M is foreseen in the radially intermediate tier 30 and arranged radially between the two pins 20 with circular section of the radially most outer tier 26.

In accordance with an embodiment, the remaining pins of the radially most outer tier 26 are pins having section, in a plane P-P substantially parallel to the flow of air along the ventilation channels, shaped like a droplet 59 having two rectilinear sides converging in the radial inward direction joined together between arcs of circle.

In accordance with an embodiment, all of the other pins 60 of the intermediate tier 30, in a plane P-P substantially parallel to the flow of air along the ventilation channels, have a section shaped like a rhombus 60.

In accordance with an embodiment, all of the pins belonging to the radially most inner tier 28 have a rhombus-shaped section 60.

In accordance with an embodiment, the pins are arranged over three tiers 26, 28, 30, the pins of the radially most outer tier 26 all have a section, in a plane P-P substantially parallel to the flow of air along the ventilation channel, with a circular shape 20. In accordance with an embodiment, the pins of the intermediate tier 30 all have a section in a plane substantially parallel to the flow of air along the ventilation channel shaped like a rhombus with four vertices 35 joined by four sides 36 in which said sides defining said section are substantially rectilinear in shape. In accordance with an embodiment, said radially inner tier 28 has all of the pins with section in a plane substantially parallel to the flow of air along the ventilation channel shaped like a rhombus with four vertices 35 joined by four sides 36, in which said sides defining said section are substantially rectilinear in shape.

In accordance with an embodiment, all of the pins of the radially intermediate tier 30 and of the radially inner tier 28 have the same extension or height L in the radial direction, preferably creating a gap 56 between the radially intermediate tier 30 and the radially outer tier 26 without pins in the circumferential direction.

In accordance with an embodiment, the pins with rhombus-shaped section of the radially intermediate tier 30 have a larger dimension or height L2 in the radial direction than the radial dimension or height L of the rhombus-shaped pin of the radially inner tier 28.

In accordance with an embodiment, there are three tiers of pins, the radially most outer tier 26 having all of its pins with section in a plane substantially parallel to the flow of air along the ventilation channel shaped like a circle 20. In accordance with an embodiment, the radially intermediate tier 30 has all of its pins 58 having a section in a plane substantially parallel to the flow of air along the ventilation channels shaped substantially like a diamond or rhombus with four vertices joined by four sides in which said sides defining said section are concave in shape to form a star shape or star-shaped pin 58. In accordance with an embodiment, said radially inner tier has all of its pins with section in a plane substantially parallel to the flow of air along the ventilation channels shaped like a rhombus or diamond with four vertices joined by four sides, in which said sides defining said section are substantially rectilinear in shape.

In accordance with an embodiment, said tiers 26, 28, 30 of pins do not overlap one another in the direction radial Z-Z to the disc.

In accordance with an embodiment, there are the same number of pins in all of the tiers 26, 28, 30.

In accordance with an embodiment, the module of pins with circular section repeats circumferentially at least a second time, preferably three times, after an angle different from 90°. In accordance with an embodiment, the module of pins with circular section repeats circumferentially at least a second time, preferably three times, after and angle of between 91° to 95°. In accordance with an embodiment, the module of pins with circular section repeats circumferentially at least a second time, preferably three times, after an angle of 92° 54'12"

In accordance with an embodiment, a pin 58 for connecting between two plates 16, 18 of a brake band 14 of a disc 10 for a ventilated disc brake, has, in a plane P-P substantially parallel to the flow of air along the ventilation channel, a section shaped substantially like a rhombus or diamond with four vertices joined by four sides in which said sides, which define said section, are concave in shape, in other words they go inwards to form a star shape the lines of which taper more than linearly advantageously extending in a substantially radial and tangential direction.

Thanks to this shape of the section of the pin, there is a large area involved in the connection with the plates, but at the same time a wide passage is kept for the air to cross the gap 22 of the band, facilitating cooling and not compromising the structural strength.

In accordance with an embodiment, the brake band 14 extends between an inner diameter D1, close to a rotation axis X-X of the disc, and an outer diameter D2, far from said rotation axis X-X of the disc. Said brake band 14 comprises two plates 16, 18 facing one another and defining a gap 22. Said plates 16, 18 are joined together by heat dissipation and connection means or elements 58, and at least some of said connection means are shaped like small columns that project from one plate towards the opposite plate in the form of pins 20, 58, 59 and 60. Said pins are grouped in at least one row or tier arranged circumferentially. Advantageously, at least some of said pins 58 of said at least one tier 30 have, in a plane substantially parallel to the flow of air along the ventilation channels, a section shaped substantially like a rhombus or diamond with four vertices 35 joined by four sides 36 in which said sides defining said section are concave in shape to form a star shape.

In accordance with an embodiment, a brake band 14 has all of the pins 58 of the same tier 30 or row with a rhombus-shaped section and concave sides.

In accordance with an embodiment, the star-shaped section has at least one portion of a concave side arc of circle shaped, preferably with radius R of between 5 mm and 20 mm and preferably with radius R of 12 mm.

In accordance with an embodiment, the star-shaped section has all of the sides concave, with at least one arc-of-circle portion, preferably with radius R of between 5 mm and 20 mm and preferably with radius R of 12 mm.

In accordance with an embodiment, the star-shaped section, between at least two of said concave sides, has a convex vertex with at least one arc-of-circle shaped portion, preferably with radius Rv of between 1 mm and 4 mm, preferably with radius Rv of 2.5 mm.

In accordance with an embodiment, the star-shaped section has sides and vertices formed exclusively by curved lines, said concave sides and said convex vertices, preferably shaped like arc-of circle, are joined together, so as to avoid corners and rectilinear portions.

In accordance with an embodiment, the star-shaped section is symmetrical with respect to a radial axis Z-Z, arranged transversal to the rotation axis X-X of the band and preferably said section is symmetrical with respect to a tangential axis T-T arranged perpendicular to this radial axis Z-Z and also to the rotation axis X-X.

In accordance with an embodiment, the star-shaped section extends in the radial direction by a predefined height LR and in the tangential direction by a predefined width LT. Advantageously, said height LR is of predefined value of between 1.5 and 2 times the width LT. Advantageously, $$LR=1.7LT.$$

In accordance with an embodiment, the pins of the brake band are grouped in at least three tiers comprising at least one outer tier 26, with at least some pins with substantially circular section, an intermediate tier 30 with pins with star-shaped section, and an inner tier 28 close to the axis X-X of the disc, the pins of said inner tier 28 having a substantially rhombus-shaped section in a plane P-P parallel to the flow of air along the ventilation channels.

In accordance with an embodiment, the ratio between the outer diameter of the band D2 and the maximum thickness of a gap 22 between the two plates 16, 18 measured in a direction parallel to the axis of the disc X-X is between 15 and 32, preferably between 21 and 25, advantageously 23.

In accordance with an embodiment, a disc for a ventilated disc brake 10 comprises a bell 12 and a brake band 14 as defined above.

According to a possible further embodiment, the pins are grouped in three concentric tiers comprising an outer tier 26; arranged close to the outer diameter D2 of the brake band 14, an inner tier 28, close to the axis X-X of the disc, and an intermediate tier 30 between the inner tier and the outer tier.

According to a possible embodiment, the pins of the inner tier 28 and the pins of the intermediate tier 30 have, in un plane substantially parallel to the flow of air along the ventilation channels, a substantially rhombus-shaped section in which the vertices of the rhombus are rounded.

In accordance with an embodiment, the intermediate tier 30 has pins with star-shaped section. In other words, with the same position of the vertices of the substantially rhombus-shaped section, the bulk of the pins according to the present invention is smaller than the bulk of pins having a rhombus-shaped section with rectilinear sides inside the ventilation channel.

Advantageously, the pins of the outer tier 26 have, in a plane substantially parallel to the flow of air along the ventilation channels, a circular section and a substantially triangular section with widened base facing towards the outside of the disc and sides inside the ventilation channel having a concave profile. In other words, with the same position of the vertices of the substantially triangular section, the bulk of the pins according to the present invention is smaller than the bulk of pins having a triangular section with rectilinear sides inside the ventilation channel.

According to a possible embodiment, for example in the case of discs having outer diameter between 350 and 440 mm, the base has a length S of between 14 and 22 mm preferably 18 mm. According to a further embodiment, for example in the case of discs having outer diameter between 280 and 350 mm, the base has a length S of between 10 and 16 mm preferably 14 mm.

According to a possible embodiment, the sides comprise at least one portion consisting of an arc of circumference of radius Rt. According to a possible embodiment, for example in the case of discs having outer diameter of between 280 and 440 mm, the sides comprise at least one portion consisting of an arc of circumference of radius Rt of between 36 and 44 mm, preferably 40 mm.

According to a possible embodiment, the sides and the widened base are joined together with arched portions. According to a possible embodiment, for example in the case of discs having an outer diameter of between 350 and 440 mm, the sides 34 and the base are joined with an arc of circumference of radius r1 of between 2 and 4 mm, preferably 2.5 mm. According to a possible embodiment, for example in the case of discs having an outer diameter of between 280 and 350 mm, the sides and the base are joined with an arc of circumference of radius r1 of between 1.5 and 4 mm, preferably 2 mm.

According to a possible embodiment, the sides are joined together at the vertex inside the ventilation channels with an arched portion. According to a possible embodiment, for example in the case of discs having an outer diameter of between 350 and 440 mm, the sides are joined together with an arc of circumference of radius r2 of between 2 and 4 mm, preferably 2.5 mm. According to a possible embodiment, for example in the case of discs having an outer diameter of between 280 and 350 mm, the sides are joined together with an arc of circumference of radius r2 of between 1.5 and 4 mm, preferably 2 mm.

According to a possible embodiment, for example in the case of a disc having an outer diameter of between 350 and 440 mm, the pins 60 of the inner tier 28 if present have a maximum thickness in the direction tangential to the disc of between 6 and 8 mm, preferably 7 mm. According to a possible embodiment, for example in the case of a disc having an outer diameter of between 280 and 350 mm, the pins 60 of the inner tier 28 if present have a maximum thickness in the direction tangential to the disc of between 4 and 6 mm, preferably 5 mm.

According to a possible embodiment, for example in the case of a disc having an outer diameter of between 350 and 440 mm, the pins 60, 58 of the intermediate tier 30 if present have a maximum thickness in the direction tangential to the disc of between 10 and 20 mm, preferably 16 mm. According to a possible embodiment, for example in the case of a disc having an outer diameter of between 280 and 350 mm, the pins 58, 60 of the intermediate tier 30 if present have a maximum thickness in the direction tangential to the disc of between 8 and 18 mm, preferably 14 mm.

According to a possible embodiment in which there are at least two tiers, the tiers have the same height, i.e. equal dimension in the direction radial to the disc.

According to a further embodiment in which there are at least two tiers, the tiers do not overlap one another in the direction radial to the disc. More specifically, each of the tiers extends between two circumferences concentric to the disc in which the circumferences that define adjacent tiers coincide. In other words, with reference to an example in which there are three tiers of pins, C1 and C2 respectively indicate the circumferences that define the inner tier 28, C2 and C3 indicate the circumferences that define the intermediate tier 30 and C4 and C5 define the circumferences that define the outer tier 26. Advantageously the circumference C2 defines both the inner tier and the intermediate one whereas the circumference C3 defines the intermediate tier and the circumference C4 defines the outer one.

According to a possible embodiment, considering an annular portion of the band sectioning the band itself between the two plates at the middle plane P-P, with the same percentage ratio between the surface of the plate and the sum of the surfaces of the sections of the pins (generally the surface occupied by the pins is substantially equal to 20-25% of that of the band), the brake band according to the present invention has a greater number of pins and therefore a greater total surface of the pins in the direction transversal to the flow of air. Advantageously, the number of pins for a tier of the brake band is between 35 and 50, even more preferably between 37 and 48.

According to a possible embodiment, in a disc with outer diameter of between 350 and 440 mm, a tier comprises from 40 to 47 pins, preferably 43 pins. According to a possible embodiment, in a disc with outer diameter of between 280 and 350 mm, a tier comprises from 34 to 41 pins, preferably 37 pins.

In the case of many tiers, it is advantageous for every tier to comprise substantially the same number of pins.

According to a possible embodiment comprising at least two tiers, the angular distance between two adjacent pins of the same tier is the same in every tier. In the case in which there are three tiers, preferably the pins of the outer tier are radially aligned with those of the inner tier whereas the pins of the intermediate tier are arranged offset with respect to those of the inner and outer tier, at about half the angular distance between two adjacent pins of the outer or inner tier.

According to a possible embodiment, the ratio between the outer diameter D2 of the brake band, and thus of the disc, and the maximum thickness of the gap between the two plates measured in a direction parallel to the axis X-X is advantageously between 15 and 32, preferably between 21 and 25, even more preferably it is about 23.

With reference to a disc with outer diameter of between 350 and 440 mm, according to a possible embodiment the plate 16 arranged on the side of the bell with respect to the middle plane P-P of the gap 22 between the two plates has a thickness in the direction axial to the disc of between 10 and 16 mm. According to a possible embodiment, the plate 16 arranged on the side opposite the bell with respect to the middle plane P-P has a thickness in the direction axial to the disc of between 10 and 15 mm. According to a further embodiment, the gap 22 between the two plates has a maximum dimension in the direction axial to the disc of between 14 and 20 mm, preferably 16 mm. The two plates can have different or the same thicknesses.

Hereafter referring to a disc with outer diameter of between 280 and 350 mm, according to a possible embodiment, the plates 16, 18 have a thickness in the direction axial to the disc of between 7 and 10 mm, preferably 8 mm. According to a possible further embodiment, the gap 22 between the two plates has a maximum dimension in a direction axial to the disc of between 10 and 15 mm, preferably 14 mm. The two plates can have different or the same thicknesses.

In accordance with an embodiment, a disc for a ventilated disc brake 10 comprises a bell 12 and a brake band 14 as defined above.

From the above it can be appreciated how foreseeing a brake band and a disc for a disc brake in accordance with the present invention makes it possible to unexpectedly improve the efficiency of the heat exchange limiting the maximum temperatures in the case of equal thermal stresses or allowing greater thermal stresses to be withstood for the same maximum temperatures reached and at the same time to improve the structural strength of the central portion of the brake band or it allows greater stresses during the braking actions and above all it allows the annoying whistles generated during braking to be reduced or eliminated.

In other words, thanks to the solutions described above it is possible to obtain ventilated brake bands that exhibit excellent cooling capability even in cases in which the brake band is used in particularly severe conditions and, at the same time, excellent mechanical strength and, above all, at the same time a reduction or elimination of braking whistles.

In particular, foreseeing pins, as described above, makes it possible, also in the extreme case of formation of cracks in the braking surface, to reduce its propagation, avoiding the disc breaking. Particularly advantageously, it has been demonstrated that the solutions described above make it possible to substantially modify the frequencies of the modes of vibration of the brake band, at medium and/or high frequency (2 KHz and/or 8-9 KHz), particularly the'modes of vibration that are located close to one another in frequency and, for this reason, are one of the main causes of whistling during braking.

The solutions described above have experimentally demonstrated that they allow these modes of vibration to be moved away from one another, moving the frequency of these modes of vibration that are the main cause for braking whistling even a few hundreds of Hz apart.

The proposed solutions make it possible to modify the geometry of the patterns of the pins in the ventilation channel or the distribution of the pins in the tiers and their shape and also in some cases, at the same time or alternatively, the dimensions of the pins, ensuring the simultaneous excellent ventilation, excellent mechanical strength and in particular the reduction of the propagation of cracks and, above all, the reduction or total elimination of braking whistles.

As can be appreciated from what has been described, the shape of the pins of the intermediate tier, and possibly of the tier close to the outer diameter D2, improves the heat exchange efficiency and the ability to make them vibrate at frequencies away from those most easily excitable to produce a braking whistle. Moreover, both the configuration and the arrangement and distribution of the pins of the inner and intermediate tiers are also particularly advantageous.

Moreover, it is particularly advantageous and synergic to foresee a disc that simultaneously has a density of the pins, in particular distributed in three tiers, and having sections in a plane parallel to the flow of air according to what has been described previously.

The advantageous effects of the present solution in which the outer tier 26 has pins with circular section, have been highlighted in some tests carried out in a virtual test bench the results of which are illustrated in the figures. In such tests the frequencies at which the disc or brake band vibrate are evaluated.

FIG. 24 illustrates, in comparison with solutions of the state of the art, the frequencies of some vibrations highlighting a movement of the frequencies and a doubling of some vibrations with movement of their frequencies from the frequencies most easily excited during the braking action.

The advantageous shape of the pins of the outer tier allows the following to be obtained. The indicated effects are further reinforced by the advantageous dimensions of the gap, by the shape and by the number of pins of the inner and intermediate tier, if present.

From simulations it can be seen that the flow of air is directed in the direction radial to the disc and substantially accelerated also obtaining a more regular distribution of the flow. In particular, the shape of the outer pins does not form an obstacle to the air coming out and indeed it helps it to flow.

Advantageously, the present invention makes it possible to obtain numerous vortex starts widely distributed over the entire surface of the pins.

It has also been found that the vortices that form have high energy above all at the intermediate pins contributing to generating a situation of turbulence particularly effective in removing heat.

The present invention thus makes it possible to obtain many areas of turbulence and greater mixing of the flow of air contributing to increasing the efficiency in taking away the heat generated during braking.

Such advantageous aspects are also highlighted by the fact that the temperature, and in particular the maximum temperature of the outer central portion of the plates, is substantially less for the same thermal stress to which the disc is subjected with respect to known discs. It has also been found that the maximum absolute temperature reached by the brake band in accordance with the present invention is substantially less than 850° K on the outer portion of the plate arranged on the side of the bell with respect to a middle plane P-P. Under the same conditions, known brake bands respectively reached 868° K.

Moreover, it has been found that the maximum temperature of a brake band according to the present invention is about 500° C. for a thermal flow of 0.370 W/mm$^2$, whereas known brake bands in the same position have reached 604° C. As further proof, keeping the maximum temperature constant, the brake bands according to the present invention withstand higher thermal flows (about 0.45 W/mm$^2$) with respect to those of the prior art (0.36 W/mm$^2$)

The brake band according to the present invention makes it possible to obtain, firstly, the decrease in the maximum temperature reached precisely at the point where cracks occur in the braking surface and at the same time to increase the structural strength and reduce or eliminate braking whistling.

The distribution, the number and the shape of the pins, together with the decrease in thickness of the plates contributes to decreasing the weight by about 100-15% with respect to known discs.

The density of the pins made is optimal in attempting to reconcile the contrasting requirements of increasing the thermal efficiency of the disc, of increasing the resistance to cracks, eliminating braking whistling and of avoiding complication in making the melting core of the disc or of the brake band. Advantageously, the maximum thickness of the gap is increased with respect to known discs, being particularly advantageous for increasing the section of the ventilation channels.

It is clear that it is possible to foresee variants and/or additions to what has been described and illustrated above. The connection means between the two plates can consist just of the intermediate tier or even just the outer tier of pins or foreseeing other embodiments replacing the inner tier. In particular, there can be other shapes of pins or other forms of connection means.

The brake band can be in one piece with the bell or else it can be formed independently and connected to it.

In accordance with an embodiment, a disc for a ventilated disc brake 10 comprises a bell 12 and a brake band 14 according to any one of the embodiments described above. In accordance with an embodiment, said tiers 26, 28, 30 do not overlap one another in the direction Z-Z radial to the disc. In accordance with an embodiment, the number of pins is the same in all of the tiers 26, 28, 30.

In accordance with an advantageous embodiment, a brake band 14 of a disc 10 for a ventilated disc brake extends between an inner diameter D1, close to a rotation axis X-X of the brake band 14, and an outer diameter D2, far from said rotation axis X-X of the disc.

Said brake band 1) comprises two plates 16, 18 facing one another and defining a gap 22.

Said plates 16, 18 are joined together by heat dissipation and connection means or elements 20, 59, 60. Said connection means 20, 59, 60 are shaped like small columns that project from one plate towards the opposite plate in the form of pins 20, 58, 59, 60 remaining inside said gap 22, or in other words avoiding part of the pin coming out from the plates of the disc, for example projecting towards a connection bell of the disc to a hub.

In accordance with an embodiment, said pins 20, 58, 59, 60 are grouped in at least two rows or tiers 26, 28, 30 arranged circumferentially. A first of said tiers 26 is arranged radially more to the outside far from said axis X-X close to said outer diameter D2. A second of said tiers 28 or 30 is arranged more to the inside in a radial direction or towards said axis X-X with respect to said first tier 26.

In accordance with an embodiment, at least two of said pins 20 of said at least one first tier 26, in un plane substantially parallel to the flow of air along the ventilation channels, have a circular-shaped section and advantageously said at least two pins 20 with circular-shaped section are arranged contiguous to one another. In accordance with an embodiment, all of the pins 20 of said radially outer first tier 26, in un plane substantially parallel to the flow of air along the ventilation channels, have a circular section.

In accordance with an embodiment, some of the pins 60 arranged in said second tier 28 or 30, in un plane substantially parallel to the flow of air along the ventilation channels, have a section shaped like a rhombus or diamond with four vertices 35 joined by four sides 36 in which said sides defining said section are substantially rectilinear or concave in shape with curved or rectilinear portions.

Thanks to the brake band as described above in which in particular at least two of said pins 20 of said at least one first tier 26 have, in un plane substantially parallel to the flow of air along the ventilation channels, a circular-shaped section and in which said at least two pins 20 with circular-shaped section are arranged contiguous to one another, and in which some or all of the pins 60 arranged in said second tier 28 or 30 have, in un plane substantially parallel to the flow of air along the ventilation channels, a section shaped like a rhombus or diamond with four vertices 35 joined by four sides 36 in which said sides defining said section are substantially rectilinear or concave in shape, with curved or rectilinear portions, it is possible to obtain a particularly efficient flow of cooling air that crosses said gap 22 and comes out from the brake band, allowing an optimal cooling of the brake band, and at the same time to allow a separation of the vibration modes of the brake band 14 in particular of the modes that contribute to the formation of braking whistles during braking.

A man skilled in the art can bring numerous modifications, adaptations and replacements of elements with other functionally equivalent ones to the preferred embodiment of the disc described above, in order to satisfy contingent and specific requirements, without however departing from the scope of the following claims.

The invention claimed is
1. Brake band of a disc for a ventilated disc brake,
said brake band extending between an inner diameter, close to a rotation axis (X-X) of the brake band, and an outer diameter, far from said rotation axis (X-X) of the brake band,
said brake band comprising two plates facing one another and defining a gap,
said plates being joined together by connection means, said connection means being shaped like columns that project from one plate towards the opposite plate in the form of pins remaining inside said gap, said pins being arranged in three tiers arranged circumferentially, comprising a radially outer tier, a radially intermediate tier and a radially inner tier;

all of said pins arranged in said radially outer tier having, in a plane substantially parallel to the flow of air along ventilation channels, a circular-shaped section, wherein said pins with a circular-shaped section are arranged contiguous to one another; wherein all of the pins arranged in said radially intermediate tier, in a plane substantially parallel to the flow of air along the ventilation channels, have a rhombus or diamond-shaped section with four vertices joined by four sides in which said sides defining said section are substantially concave in shape with curved portions to form a star shape or star-shaped pin; and wherein all of the pins arranged in said radially inner tier, in a plane substantially parallel to the flow of air along the ventilation channels, have a rhombus-shaped section with four vertices joined by four sides, wherein said sides defining said section are substantially rectilinear in shape.

2. Brake band according to claim 1, the tiers being arranged concentric to one another in which each pin is offset with respect to the closest pins of the adjacent tiers in a quincunx arrangement.

3. Brake band according to claim 1, wherein every tier of pins has an equal number of pins to the other tiers.

4. Brake band according to claim 1, wherein the number of pins with circular-shaped section of a radially most outer tier is double the number of pins of the adjacent tier.

5. The brake band according to claim 4, wherein some of the pins with circular-shaped section radially overlap the pins of the adjacent tiers.

6. Brake band according to claim 1, wherein between said tiers of pins, there is a circumferential gap or circumferential ring free from pins in a circumferential direction.

7. Brake band according to claim 6, wherein said circumferential gap has a longer radial extension than a radial extension of the pins with circular section foreseen in a radially most outer tier.

8. Brake band according to claim 6, wherein said circumferential gap has a shorter radial extension than a radial extension of the pins with circular section foreseen in the radially most outer tier.

9. Brake band according to claim 1, wherein all of the pins of the radially intermediate tier and of the radially inner tier have the same extension or height in the radial direction, creating a gap between the radially intermediate tier and the radially outer tier without pins in the circumferential direction.

10. Brake band according to claim 1, wherein the pins with a rhombus-shaped section of the radially intermediate tier have a size or height in the radial direction that is greater than the radial size or height of the rhombus-shaped pins of the radially inner tier.

* * * * *